235-401 SR
OR 2,701,098
SEARCH ROOM
2 NO XR

Feb. 1, 1955 C. H. TOWNES 2,701,098

CONCEALED GROUND TARGET COMPUTER FOR AIRCRAFT

Filed April 23, 1945 9 Sheets-Sheet 1

INVENTOR
C. H. TOWNES
BY
AGENT

Feb. 1, 1955 C. H. TOWNES 2,701,098

CONCEALED GROUND TARGET COMPUTER FOR AIRCRAFT

Filed April 23, 1945 9 Sheets-Sheet 2

INVENTOR
C. H. TOWNES
BY
D. MacKenzie
AGENT

CONCEALED GROUND TARGET COMPUTER FOR AIRCRAFT

Filed April 23, 1945 9 Sheets-Sheet 3

INVENTOR
C. H. TOWNES
BY D. MacKenzie
AGENT

INVENTOR
C. H. TOWNES
BY D. MacKenzie
AGENT

CONCEALED GROUND TARGET COMPUTER FOR AIRCRAFT

Filed April 23, 1945 9 Sheets-Sheet 5

INVENTOR
C. H. TOWNES
BY
D. MacKenzie
AGENT

INVENTOR
C. H. TOWNES
BY
D. MacKenzie
AGENT

CONCEALED GROUND TARGET COMPUTER FOR AIRCRAFT

Filed April 23, 1945 9 Sheets-Sheet 7

INVENTOR
C. H. TOWNES
BY
D. MacKenzie
AGENT

Feb. 1, 1955 C. H. TOWNES 2,701,098

CONCEALED GROUND TARGET COMPUTER FOR AIRCRAFT

Filed April 23, 1945 9 Sheets-Sheet 8

INVENTOR
C. H. TOWNES
BY
D. Mackenzie
AGENT

INVENTOR
C. H. TOWNES
BY
D. MacKenzie
AGENT 2,701,098
Patented Feb. 1, 1955

2,701,098

CONCEALED GROUND TARGET COMPUTER FOR AIRCRAFT

Charles H. Townes, Chatham, N. J., assignor to Bell Telephone Laboratories, Incorporated, New York, N. Y., a corporation of New York Application April 23, 1945, Serial No. 589,825

9 Claims. (Cl. 235—61.5)

This invention relates to an improvement in electrical bombsights, providing means for an attacking airplane to release a bomb against a target which is concealed, both optically and electrically, from the airplane but lying in a known direction and at a known distance from an observable point more remote than the target.

An object of the invention is to provide means whereby an electrical bombsight may be used in attacking a concealed target of which the location is known with respect to a point of observation beyond the target.

In the course of solving the bombing problem presented by the situation above described, it is necessary to determine continuously, from observations on a point beyond the target hereinafter called the aim point, the distance to the target itself and the speed of the airplane relative to the target.

It is thus another object of the invention to provide electrical means for determining the distance and speed of an airplane relative to a concealed point by observation on a more remote point.

The invention also provides means for determining under any wind conditions the appropriate direction of flight of an airplane toward a hidden objective for a purpose which may be commercial as well as military. It is therefore a further object of the invention to enable the pilot of an airplane to obtain by electrical means all information needed to guide him to his destination from observations of a point in a known location beyond that destination.

It will appear from the following description that once the azimuth A and the horizontal range R of the target have been determined from the azimuth $A_a$ and the slant range $R_s$ of the aim point, the further computations leading to the establishment of the release and steering equations are performed in the same way as by conventional bombsight computers from observations directly on the target. The present invention provides a system of apparatus including means for transforming observations of $A_a$ and $R_s$ into determinations of A and R, and including as an important tracking aid a cathode-ray oscilloscope on the screen of which the direction of the aim point is referred to a fixed direction, that from aim point to target.

The invention, as applied to military purposes, will be described with reference to the accompanying drawings in which the geometry of the problem and the apparatus for its solution are represented and in which.

Figure 2:
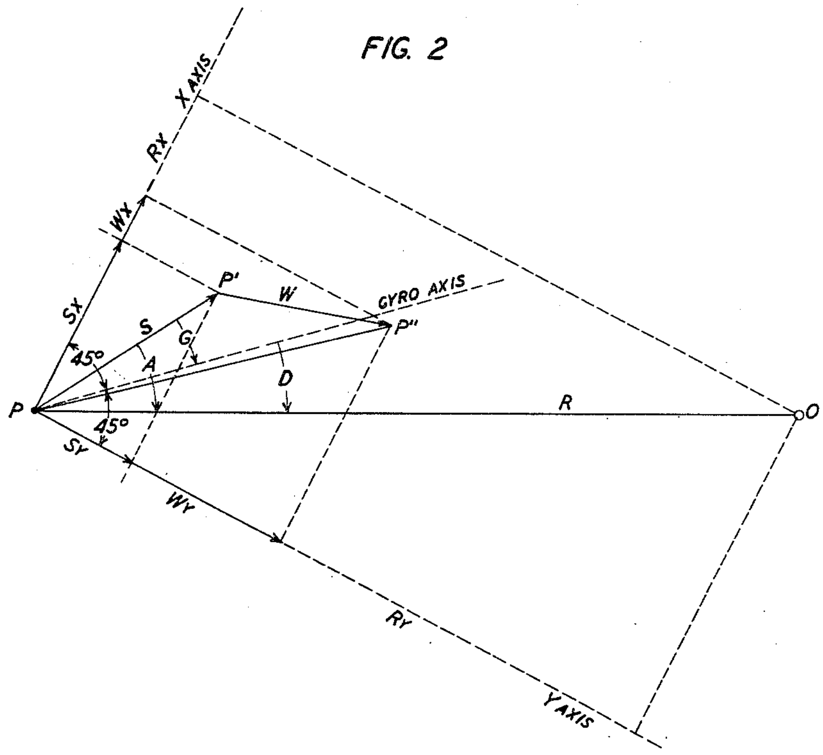
Fig. 2 is a horizontal projection of the components of the air speed of the airplane and of the wind velocity concerned in the solution of the bombing problem.
Figure 3:
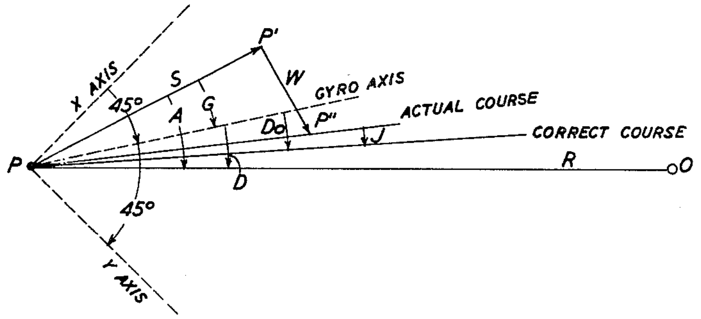
Fig. 3 shows in horizontal projection the relation, at an illustrative instant, of the airplane heading to the course required for a successful attack upon the target.
Figure 4:
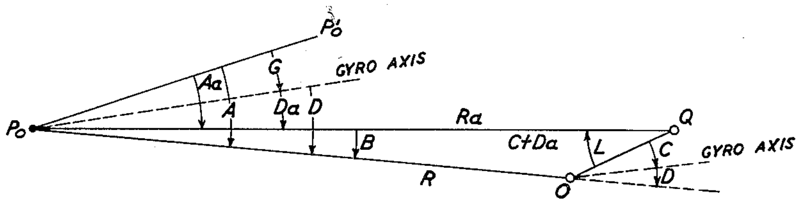
Fig. 4 shows in horizontal projection the relations, also at an illustrative instant, of the airplane to the target and to the aim point.
Figure 7:
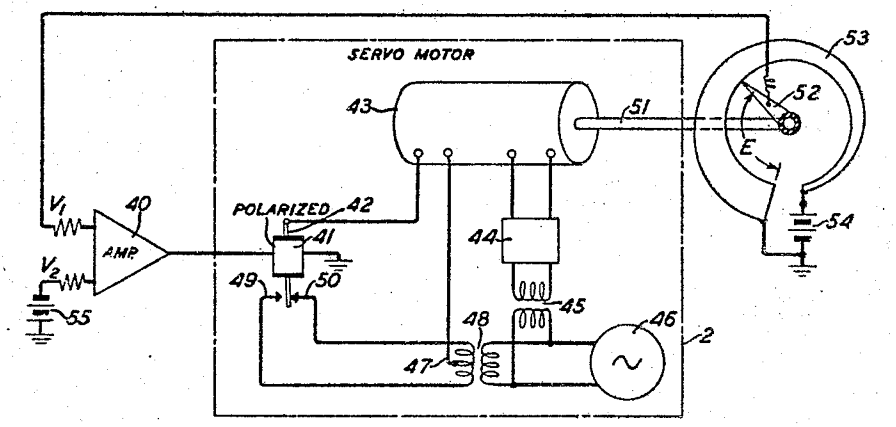
Figure 9:
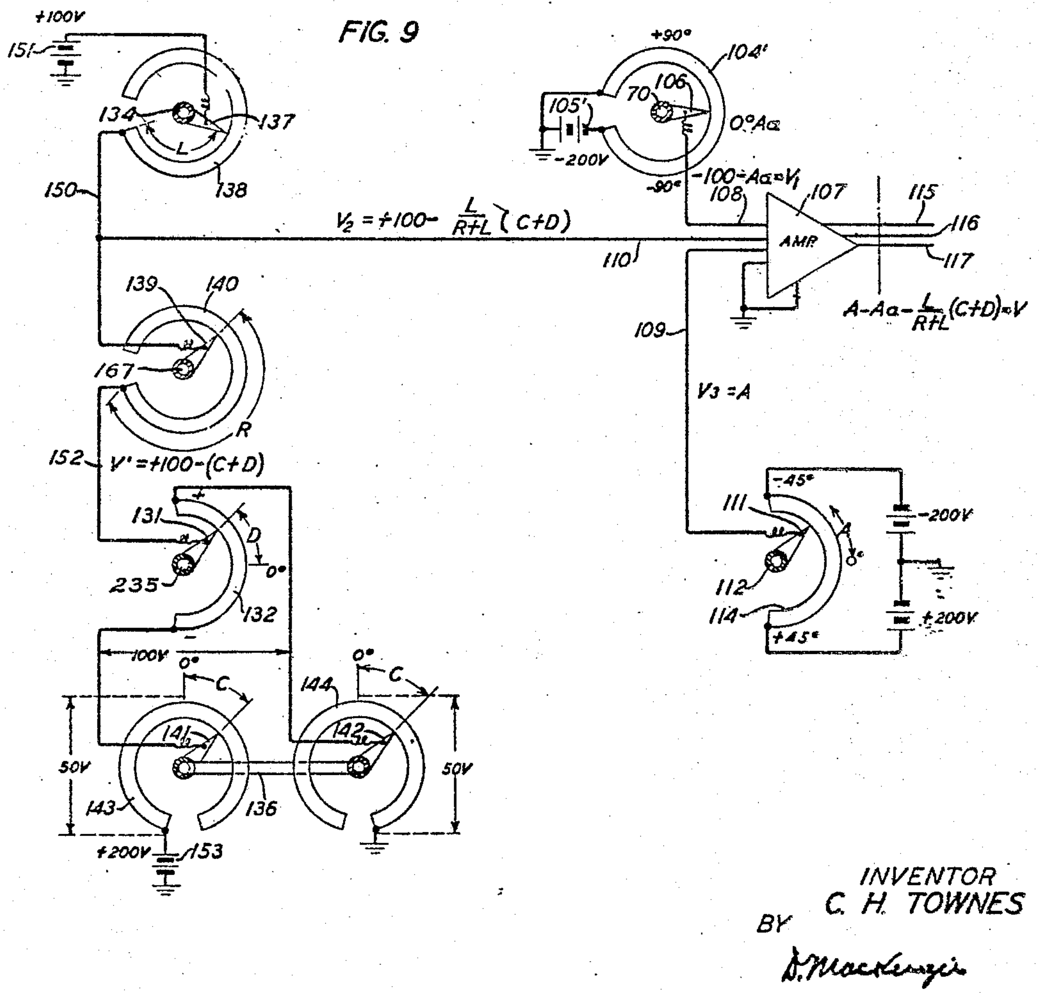
Figure 8:
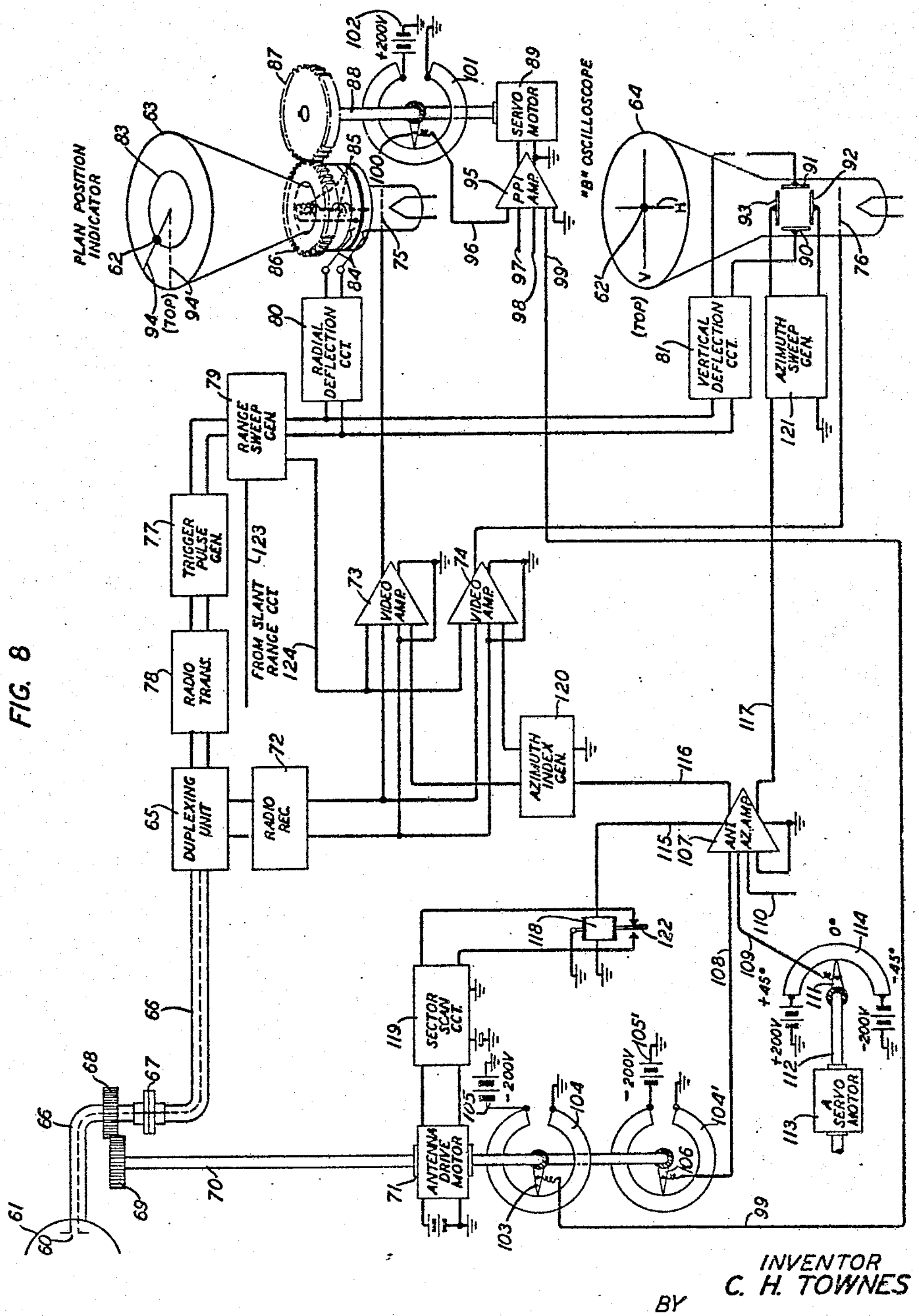
Figure 10:
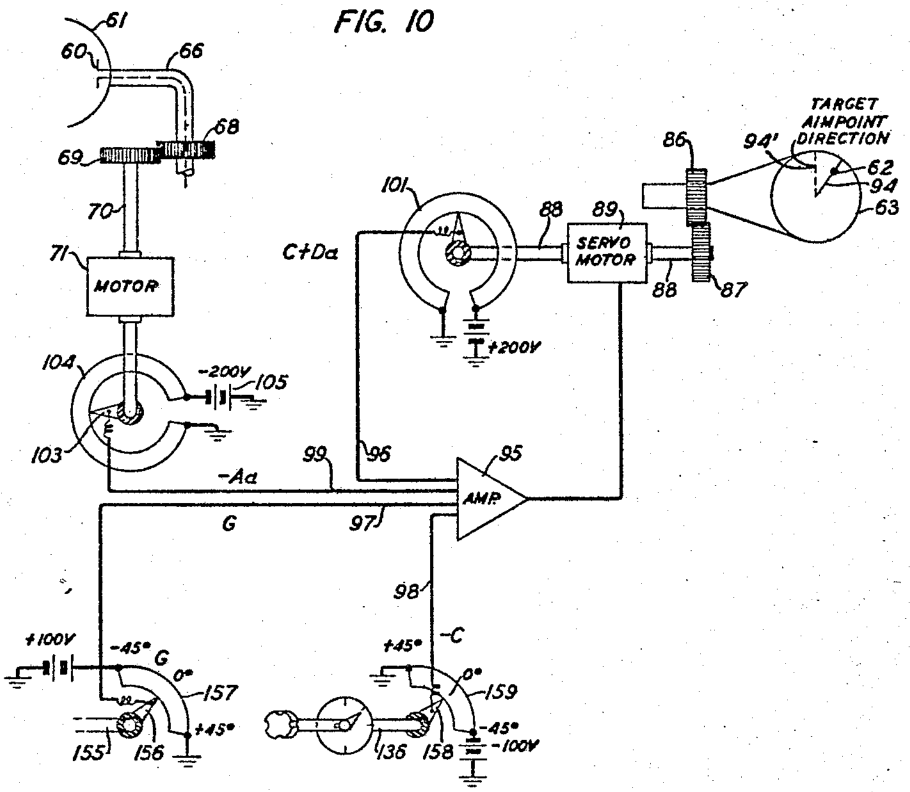
Figure 11:
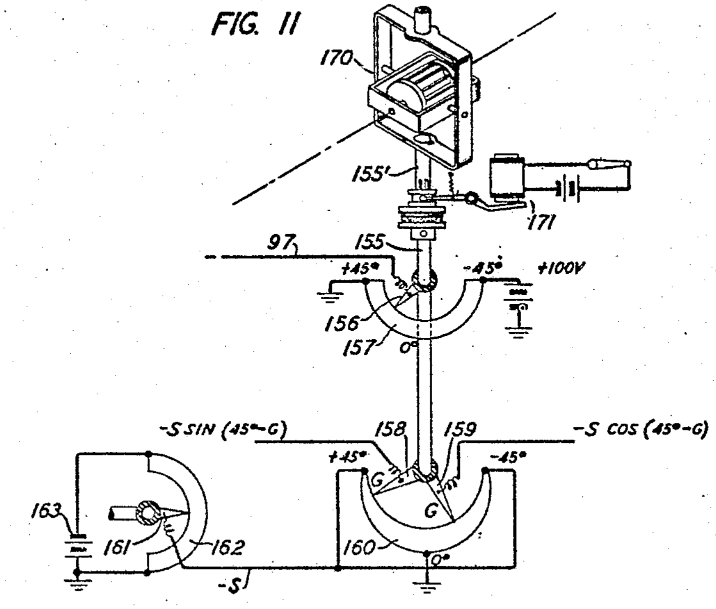
Figure 12:
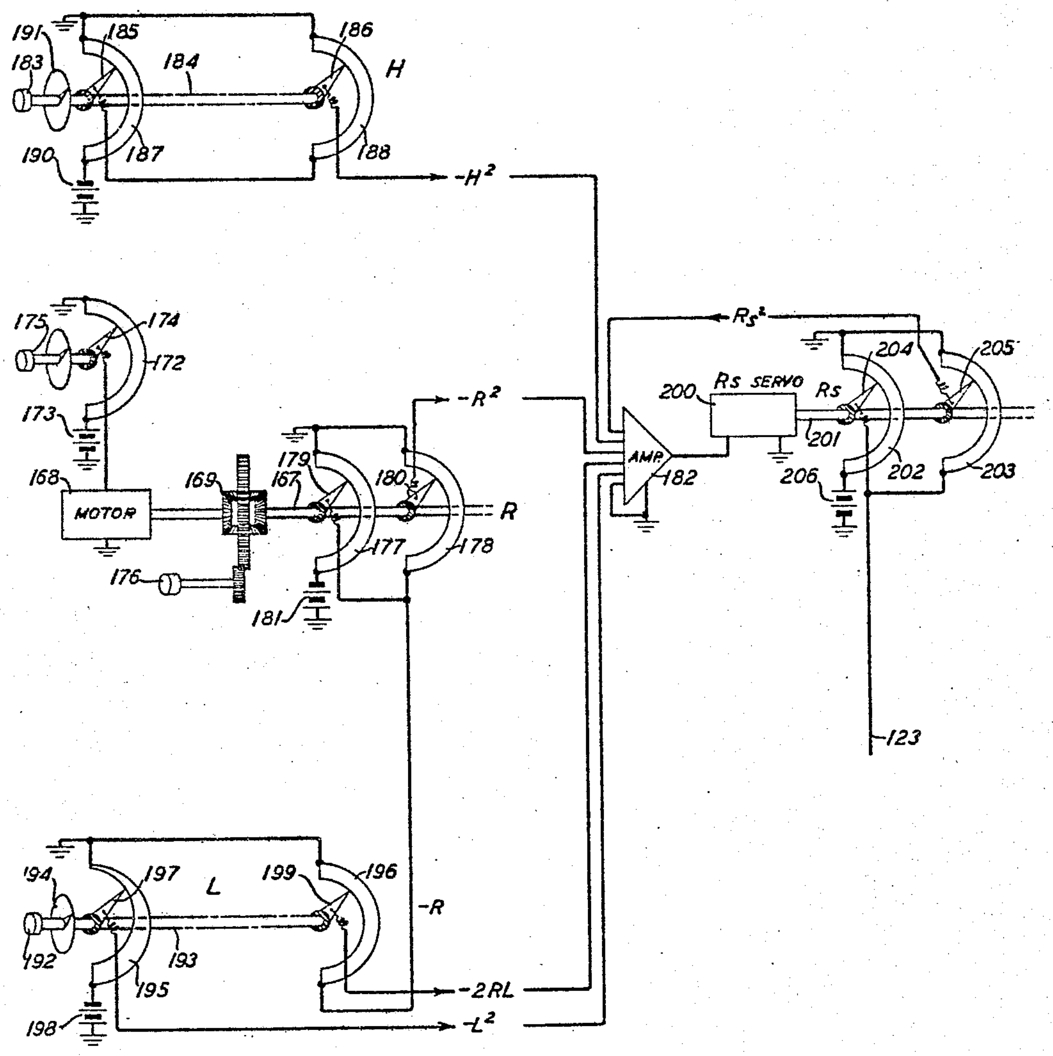
Figure 13:
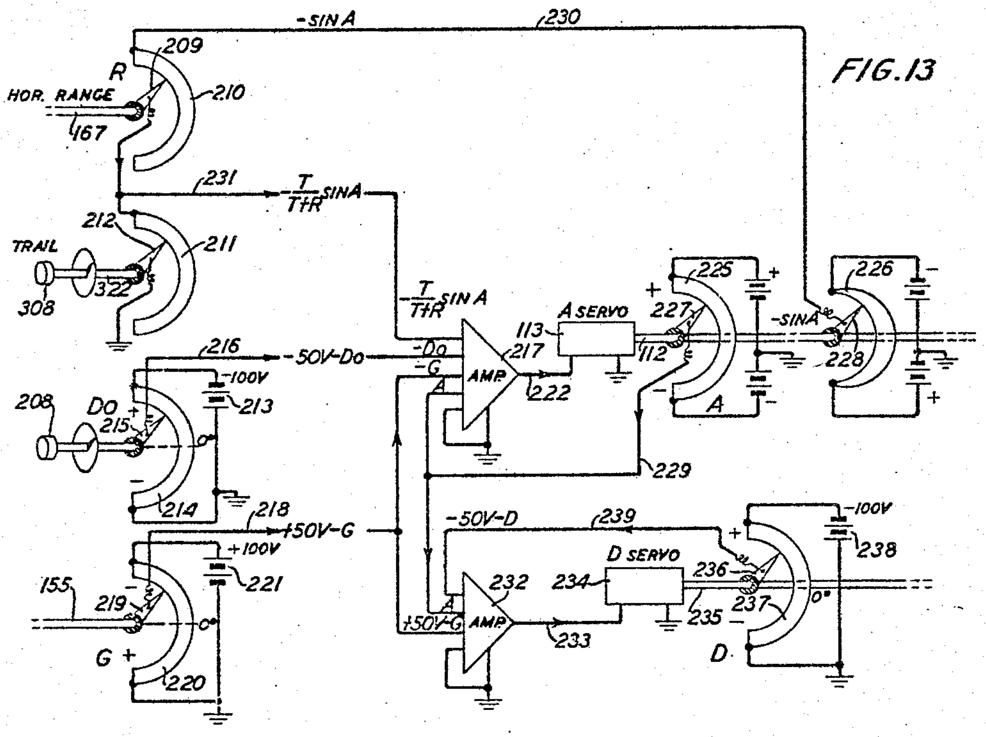
Figure 14:
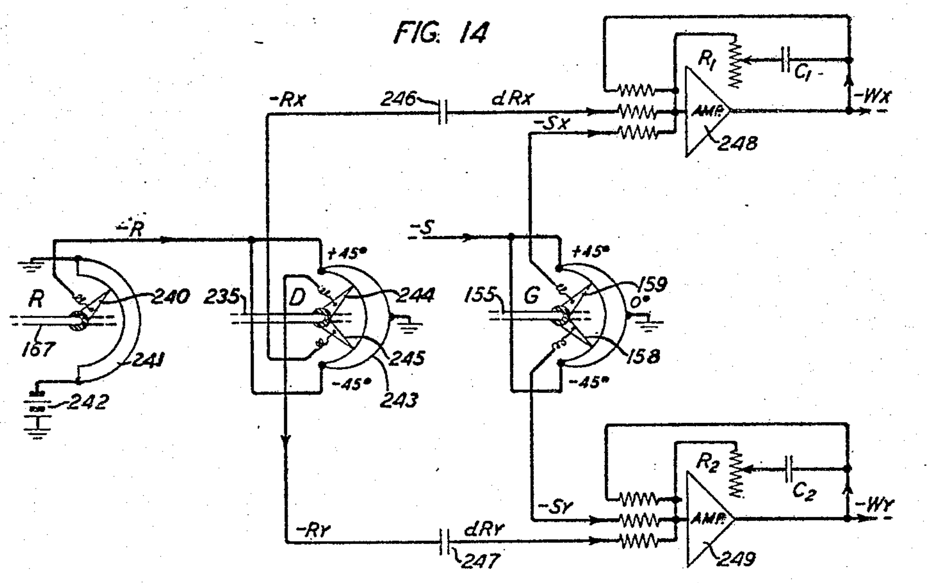
Figure 15:
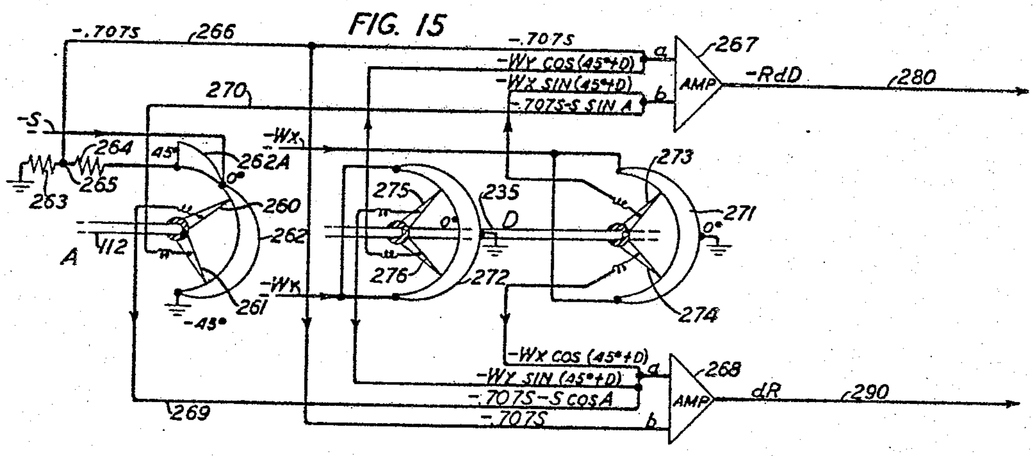
Figure 16:
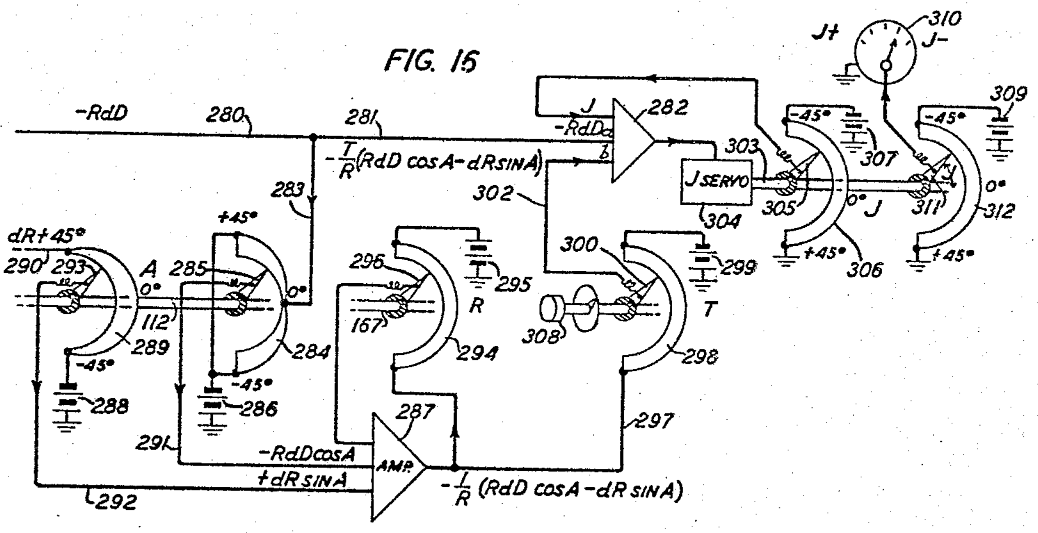
Figure 17:
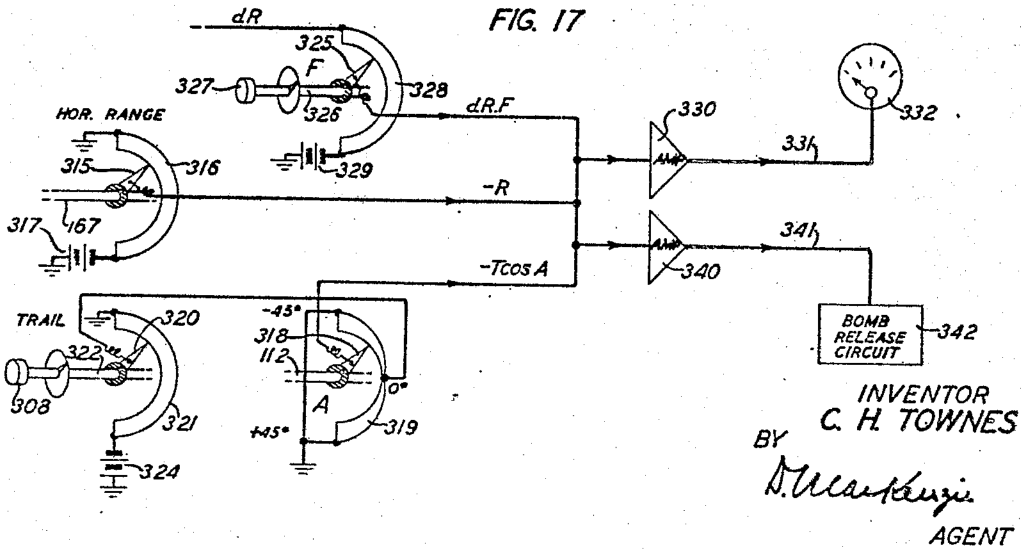

Figs. 6A to 6E, inclusive, are diagrammatic circuits of various amplifiers used in the electrical system of the invention;

Fig. 7 is a diagrammatic representation of a circuit including a servomotor whereby a voltage may be established equal to a given voltage or sum of voltages;

Fig. 8 is a schematic diagram of a radar system cooperating with the system of the invention;

Fig. 9 is a circuit diagram showing the sources of voltage inputs to one summing amplifier of Fig. 8;

Fig. 10 is a circuit diagram showing the sources of voltage inputs to another summing amplifier of Fig. 8;

Fig. 11 represents diagrammatically the means for referring the heading of the airplane to the gyro axis and for deriving voltages proportional to the X and Y components of corrected air speed;

Fig. 12 is a schematic of the means for establishing a shaft motion representing the slant range to the aim point;

Fig. 13 is a schematic of the means for providing shaft motions representing the angles A and D of Figs. 2, 3 and 4;

Fig. 14 shows the derivation of averaged values of the X and Y components of the wind speed;

Fig. 15 is a schematic showing the computation of the components, toward the target and at right angles thereto, of the airplane horizontal speed;

Fig. 16 shows the computation of the steering angle J between the actual ground course of the airplane and the correct bombing course; and Fig. 17 shows the computation of the horizontal distance to the release point.

In all figures, like elements are designated by like numerals or letters.

It will be assumed that the attacking airplane is equipped with known means for the measurement of altitude and air speed, together with the necessary directional gyro and other flight-controlling means, and that flight is maintained at constant altitude from the beginning of the bombing run. Further, knowledge will be assumed of the trail and time of fall of the bomb to be released corresponding to the air speed and altitude of the attack.

Figure 1:
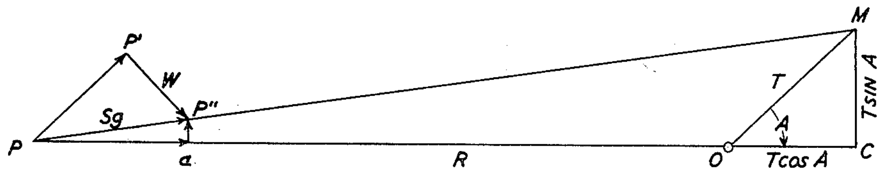
Fig. 1 is a horizontal projection of the required course of the airplane relative to the target to be attacked.

Referring now to Fig. 1, the airplane at P is flying at constant altitude H and with air speed S (corrected for temperature and pressure) in the direction PP′ in a wind of velocity W directed along the line P′P″. At the end of unit time the airplane will reach P″. If the course PP″ relative to the ground is the correct bombing course, and if P is the appropriate point to release a bomb to strike the target O, the airplane will, if it continues on this course, be at the point M when the bomb strikes the target. The distance PM equals $S_gF$ where $S_g$ is the ground speed of the airplane in feet per second and F is the time of fall of the bomb in seconds from the altitude H at which the airplane is flying. The trail of the bomb, known from ballistic tables to be T feet, will extend astern of the airplane parallel to the heading PP′. R is the horizontal distance in feet from a point directly beneath P to the target, and A is the angle between the heading PP′ and the direction of the target from the airplane at the instant of bomb release. Completing the triangle PMC, it is seen that during the time of fall of the bomb, the ground course would if unchanged have carried the airplane in the direction PO through the distance $R+T\cos A$ and at right angles to this direction through the distance $T\sin A$. The angle MPO between the vertical plane including the correct bombing course and that including the airplane and the target at the moment of bomb release is expressed as $$\tan MPO=\frac{T\sin A}{R+T\cos A}$$

Now, P$a$, the projection of PP″ on PO, is the component of airplane ground speed in the direction of the target, while P″$a$ is the component of ground speed at right angles to the target. If we write $Pa=dR$ where $d$R is the rate of decrease of R with time, PC becomes $R+T\cos A$ or $dR.F$. At right angles to the line from the airplane to the target, the speed of the airplane at P is equal to the instantaneous range $R$ times $dA$, where $dA$ is the time rate of change of the target bearing for the airplane flying with unchanged heading. MC then equals $RdA.F=T\sin A$. Thus, $$\frac{T\sin A}{R+T\cos A}=\frac{RdA}{dR}$$

which may be written $$\frac{T}{R}(RdA\ \cos A - dR.\ \sin A) + RdA = 0$$

A is here the angle which at the release instant the heading of the airplane should make with the direction toward the target. As will be later explained, a horizontal axis fixed in space is established with respect to which are measured the various directions such as airplane to target, wind speed and air speed of the airplane. Since with unchanging heading A differs from D (the bearing of the target with respect to the fixed axis) by a constant angle G, the time rates of change of angles D and A are the same, and $dD$ may be written for $dA$.

The relations above stated may be written:

$$R + T\ \cos A - dR.F = O \qquad (1)$$

and $$\frac{T}{R}(RdD\ \cos A - dR.\ \sin A) + RdD = 0 \qquad (2)$$

Equations 1 and 2 are the "release equation" and the "steering equation," respectively, and are in form suitable for computation by electrical means. By such means, voltages proportional to the respective terms of Equations 1 and 2 are continuously established and compared. As the airplane maneuvers in approaching the target, A, D and R are continuously changing and the release and steering equations are simultaneously satisfied only when the airplane reaches a heading and a horizontal distance from the target appropriate for bomb release. At a greater horizontal distance, the left-hand member of Equation 1 has a positive value proportional to the distance to go before reaching the release position. The terms of the left-hand member of the Equation 2 are all velocities and when their sum is positive, the angle A is too small for successful bombing even if Equation 1 is satisfied. This implies that the heading of the airplane is to the right of that necessary to fly the correct bombing course.

For each equation, the left-hand member can be represented by a voltage which is read on a meter. In one case, Equation 1, the voltage read represents distance and the scale of the meter is calibrated in feet; in the other case, Equation 2, the voltage read represents velocity and the meter scale is calibrated in angle. When a positive angle is read on the latter meter, the correct bombing course is to the left of the course then being steered. The meters will be referred to as the "distance-to-go" and the "steering" meters, respectively.

In the practice of the present invention, the quantities required in the release and steering equations are derived by an electrical computer from observations on an aim point beyond the target and lying at a known distance and in a known direction therefrom. The range and bearing of the aim point, and the rates of change of these, are directly observed and manipulated to provide the corresponding quantities for the target itself.

Fig. 2 shows the components of the wind and of the air speed of the airplane at P, in horizontal projection with reference to X and Y axes, the right angle between which is bisected by the "gyro axis." By "gyro axis" is meant the fixed direction in space established as later described at the time of beginning of the approach to the target O by the fore and aft axis of the airplane at that time and kept fixed by the action of a directional gyro. When the airplane reaches P, Fig. 2, its heading is changed from coincidence with the gyro axis to the direction PP′ in which it is now flying with unchanged air speed S. The wind blows with velocity W in the direction P′P″, so that the ground speed of the airplane is represented in direction and magnitude by PP″. At the usual altitudes of flight, the wind is of substantially constant velocity and direction.

In Fig. 2 the gyro axis makes the angle D with the line from airplane to target, the horizontal range being R. The XY angle is always bisected by the gyro axis, so the X and Y components of R may be written $$R_x = R\ \cos\ (45° + D),\ R_y = R\ \sin\ (45° + D)$$

The corresponding components of air speed and wind velocity $S_x$, $S_y$, and $W_x$, $W_y$, are indicated in the figure and it is obvious that the X and Y components of the rate of decrease of R for the ground course PP″ are $S_x + W_x$, $S_y + W_y$, respectively. The angles D, A and G are counted positive clockwise as shown.

Fig. 3 shows, for the same conditions of flight from point P as in Fig. 2, the correct bombing course of Fig. 1 in relation to the actual ground course of Fig. 2, here assumed to the left of the correct course by the angle J which is to be determined by the computer and, in this case, read as a negative angle on the steering meter.

Referring to Fig. 4, $P_0$ is the position of the airplane before reaching the release point P, Fig. 1. The horizontal distance from the airplane at $P_0$ to the target O is designated by R, that to the aim point Q by $Ra$. L is the horizontal distance from target to aim point. The heading $P_0P_0'$ of the airplane at $P_0$, not necessarily on the correct bombing course, makes the angle G with the axis of a directional gyroscope previously erected parallel to the airplane heading at the beginning of the attack. The true bearing of the gyro axis is known, as well as the true bearing of the target-aim point line OQ, and the difference of these bearings is the angle C, counted positive if the direction of the gyro axis is to the right of the target-aim point direction. As in Fig. 3, all angles are positive if clockwise as seen from above the plane of maneuver. In the situation shown in Fig. 4, the attack is from west to east and the aim point is beyond and to the north of the target. Distance L and angle C are referred to as offset distance and offset angle, respectively. Other angles are: $Aa$ and A, the momentary bearings of the aim point and of the target, respectively, clockwise from the airplane heading; $Da$ and D, respectively the angles clockwise from the gyro axis to the directions of the aim point and of the target from the airplane. The angle $P_0QO$ is seen to be equal to $C + Da$. The angle B between the lines airplane to aim point and airplane to target is given by $$\tan B = \frac{L\ \sin\ (C+D)}{R + L\ \cos\ (C+D)}$$

Figure 5:
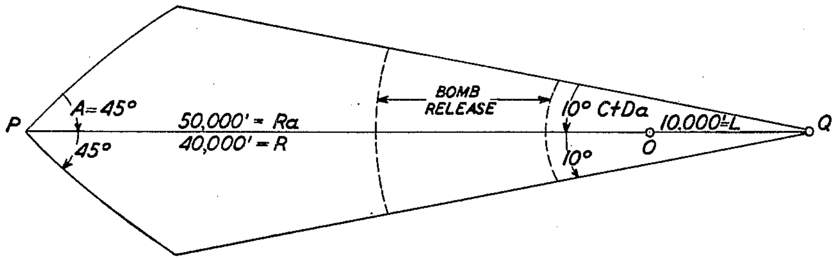
Fig. 5 illustrates the permissible area of maneuver for an airplane attacking a target beyond and distant 10,000 feet from an observed aim point.

Were there no offset, the target itself being under observation, the attacking airplane might approach from any direction. As the computing equipment, by means not necessary to describe here, limits the range of angles A, D and G to ±45°, the area of maneuver is to that extent restricted even without offset. With offset a further restriction is imposed, namely, that from an initial position in line with the target and aim point, the airplane may fly in a directon not more than 45 degrees either side of this line and not outside of the sector included between two lines meeting at the aim point and making each with the target-aim point line the angle $(C + Da)$, which for an offset distance of 10,000 feet should not exceed 10 degrees or 30 degrees for an offset distance of 500 feet. This limitation of the angle $C + Da$, imposed for the sake of simplicity of apparatus, enables the bent line $P_0OQ$ to be treated as straight. This area of maneuver is shown in Fig. 5.

Were there no wind, the correct bombing heading at release would be directly toward the target and thus to the right of the aim point in the situation represented in Fig. 4. With the wind direction and speed assumed in Figs. 2 and 3, the airplane must head into the wind and it is required that the heading at release be to the left of the target. As will be later explained, observations of aim point range and bearing are continuously made by a tracking process and these observations are used to compute components of ground speed toward and at right angles to the target.

For the automatic solution of the bombing problem arising in the situations illustrated by Figs. 1 to 5, the present invention provides an electromechanical system of apparatus including potentiometers of various characters of winding, on some of which the brushes are set by hand while on others they are driven by servomotors, together with numerous amplifier circuits whereby, in effect, voltages are added, subtracted, divided, differentiated or averaged with respect to time. The shaping of a potentiometer to permit a brush traversing it to derive a voltage variously related to the brush position is a matter of common knowledge, as is also the functioning of a servomotor. These features will not be described in detail, since they are in themselves no part of the invention. At the same time a complete understanding of the circuit requires a brief description of the amplifiers which operate as above recited on the voltages supplied. These amplifiers likewise are not in themselves a part of the invention and the properties of the fundamental circuit and of the modifying additions to be shown are well understood in the art, wherefore the descriptions omit mathematical proofs.

Figure 6A:
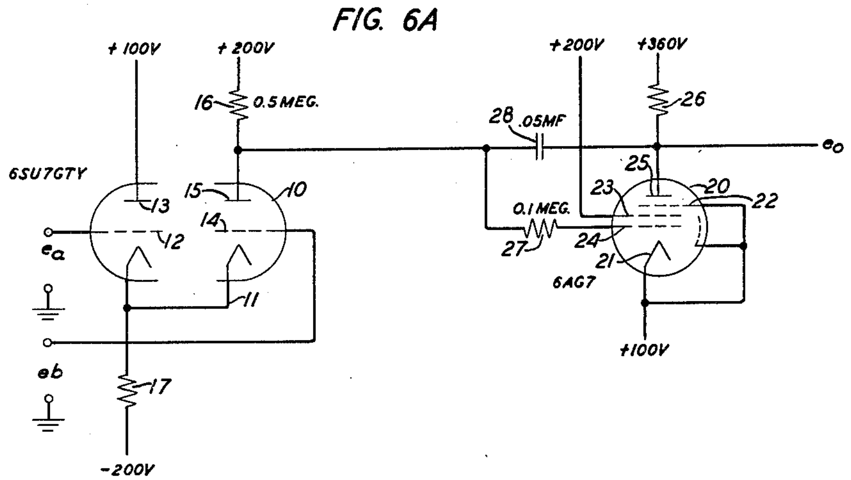

Fig. 6A is a schematic diagram of the fundamental two-stage direct current amplifier used in numerous places in the system of the invention. In the first stage tube 10, suitably a 6SU7GTY, is a double triode with common cathode 11. The first section of tube 10 comprises cathode 11, grid 12 and anode 13, the second section comprises cathode 11, grid 14 and anode 15. From a source of constant voltage, not shown, anode 13 is supplied with a positive potential of 100 volts, and 200 volts positive potential is supplied through resistor 16 to anode 15. Cathode 11 is connected through resistor 17 to a negative potential of 200 volts. Tube 20 of the second stage may be a double triode or, as shown in Fig. 6A, a pentode such as the 6AG7. Of such a pentode, cathode 21 is connected directly to suppressor grid 22 and to +100 volts. Screen grid 23 is supplied with 200 volts positive while anode 25 is supplied through resistor 26 from +360 volts. Control grid 24 is connected through resistor 27 to anode 15 of tube 10 and through condenser 28 to anode 25 of tube 20. Between anode 25 and ground is taken the output voltage $e_0$ resulting from the voltage $e_a$ or $e_b$, or both, on grids 12 or 14, or both, of tube 10. With no voltages on grids 12 and 14 the same anode current flows in both sections of tube 10 since the voltage drop across the resistor 16 results in a potential of about 100 volts at anode 15, nearly the same as at anode 13. The combined anode currents, each about 0.2 milliampere, flow through the common cathode resistor 17 producing thereacross a voltage drop of about 200 volts fixing cathode 11 at nearly ground potential. In use, grids 12 and 14 are each held at ground potential so that cathode 11 assumes a low positive biasing potential.

In the second stage, cathode 21 has a potential 100 volts positive and slightly higher than that of anode 15 to which grid 24 is connected through resistor 27. Grid 24 is thus appropriately biased negative with respect to cathode 21. With the circuit shown tube 20 passes current such that the voltage at anode 25 remains, with no voltage on grids 12 and 14, about 200 volts positive to ground, a voltage considered reference level for the amplifier of Fig. 6A. Condenser 28 is connected between anodes 15 and 25.

Considering the first section of tube 10 as a cathode follower, it is seen that a voltage applied to grid 12 appears at cathode 11 with the same sign and nearly the same value. With no voltage on grid 14 the grid-cathode voltage on the second section of tube 10 will change in accordance with the potential of cathode 11 and this change will be amplified to appear as a voltage at anode 15 of the same sign as the voltage applied to grid 12. On the other hand, with no voltage on grid 12 but with a change in potential of grid 14, the amplified voltage change at anode 15 will be of opposite sign to the change on grid 14. Thus, for equal voltages of the same sign applied to grids 12 and 14 simultaneously, no voltage change takes place at anode 15. Tube 10 thus enables a signal voltage on grid 14 to be subtracted from a signal voltage on grid 12. It may be shown that a given signal on grid 14 is amplified slightly more than an equal signal on grid 12 and this effect is compensated by adjustment of the input networks through which signals are applied to the two grids. It may be further shown that the gain of the second section is substantially independent of the signal voltages and that the potential of cathode 11 is stable. Cathode heating power, not shown, is conventional.

With the amplifier circuit of Fig. 6A, the voltage change at anode 25, $e_0$, is proportional $e_a-e_b$. If further amplification is required, a push-pull third stage is connected to the output circuit of tube 20. The electrical circuit of the invention utilizes in various places the amplifier of Fig. 6A with one or more of the modifications to be described and either with or without a third push-pull stage. In later description, grids 12 and 14 are referred to as inputs "*a*" and "*b*," respectively.

Figure 6B:
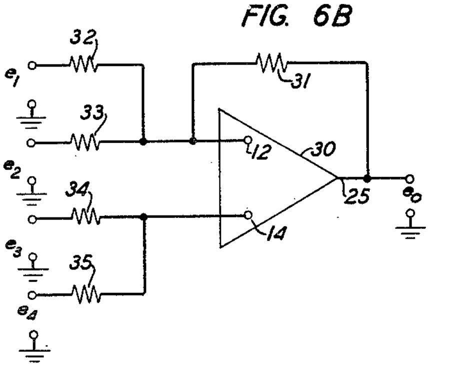

In Fig. 6B the two-stage amplifier just described is symbolized by triangle 30 in which the connections to grids 12 and 14 and to anode 25 are indicated. Negative feedback resistor 31 is connected directly between anode 25 and grid 12. A pair of voltage signals $e_1$ and $e_2$ are connected through individual resistors 32 and 33, respectively to grid 12. Voltage signals $e_3$ and $e_4$ are similarly connected through resistors 34 and 35 to grid 14. As is well known to the art, a large amplification factor for amplifier 30 with a large negative feedback through the high resistance of resistor 31 results in reducing to a very small value the input impedance of amplifier 30. As above stated amplifier 30 may be of two or three stages as required.

The low input impedance brings it about that currents in the input circuit of amplifier 30 are substantially determined only by the resistances of resistors 32 to 35, for given input voltage signals. If these resistances are equal, the input current between grid 12 and ground is proportional to $e_1+e_2$, that between grid 14 and ground to $e_3+e_4$. The input voltages to amplifier 30 across this low and stable input impedance are thus likewise proportional to $e_1+e_2$ and to $e_3+e_4$, respectively, and the amplified output voltage $e_0$ is proportional to $(e_1+e_2)-(e_3+e_4)$. Obviously, the resistances of resistors 32 to 35 may be so chosen as to fractionate as desired one or more of the input voltages. The factor of proportionality between output voltage and input voltage is given by $$e_0=e_1\frac{R31}{R32}, \text{ etc.}$$

Hereinafter the circuit diagrammatically shown in Fig. 6B will be called a "summing amplifier" if input voltages are to be summed, a "differencing amplifier" if the difference of input voltages is to be derived. In certain situations it is necessary only that the sum of the input voltages be zero. This is particularly the case when one of the voltages is derived from a brush traversing a potentiometer and turning with the shaft of a servo-motor itself driven by the output voltage of the summing amplifier. In such a case it is not requisite that the amplifier input impedance be small, but only that the servo-motor comes to rest when the voltage sum is zero, and this may be the case for any value of amplifier input impedance. Where feedback is derived from a servo-driven potentiometer brush, electrical feedback by resistor 31 is dispensed with.

Figure 6C:
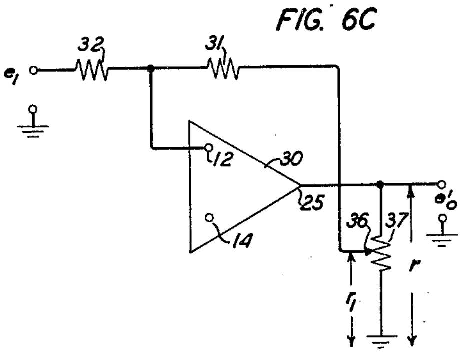

If the amplifier of Fig. 6A is provided with negative feedback through a resistor connected between grid 12 and a selected point on a potentiometer connected in shunt between anode 25 and ground, then the output voltage will be, not $e_0$, but $$e_0 x \frac{r}{r_1}$$

where $r$ is the total resistance of the shunt potentiometer and $r_1$ is the resistance included between ground and the point on the potentiometer to which is connected the feedback resistor. Such a circuit will be referred to as a "dividing amplifier" and is illustrated in Fig. 6C. Therein is shown a circuit for dividing the output voltage, comprising amplifier 30, feedback resistor 31, signal voltage $e_1$ applied to grid 12 through resistor 32, all as in Fig. 6B except that resistor 31 is connected, not directly to anode 25 but to tap 36 on potentiometer 37 shunting the output of amplifier 30. The output voltage is not $$e_0=e_1\frac{R_{31}}{R_{32}}$$

as in the circuit of Fig. 6B with one input on grid 12, but $$e_0'=e_0\frac{r}{r_1}=e_0\frac{R31}{R32}\cdot\frac{r}{r_1}$$

If $R31=R32$, the output voltage is proportional to the input voltage divided by $r_1$, a quantity which may be made to present, for example, the horizontal range of the target.

Figure 6D:
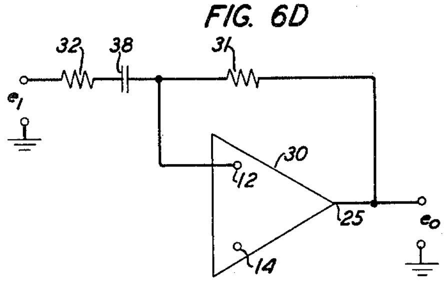

In Fig. 6D the circuit of Fig. 6B is shown with only one signal input which is connected through resistor 32 and condenser 38 in series to grid 12 and to resistor 31. The current through condenser 38 and so through the input impedance of amplifier 30 is proportional to the time rate of change of the applied signal voltage $e_1$. The output voltage of amplifier 30 is thus proportional to the time derivative of $e_1$ and the circuit of Fig. 6D will be referred to as a "differentiating amplifier." Other inputs, $e_2$, etc. of Fig. 6B may be included and may be differentiated or not.

Figure 6E:
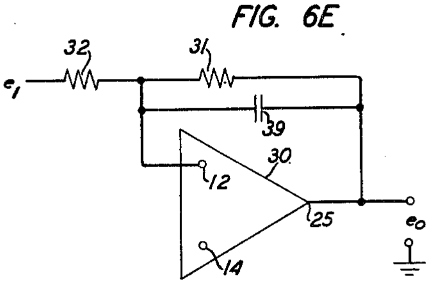

Finally, in Figs 6E is shown a modification of Fig. 6B (again for simplicity only one input signal is represented) providing an output voltage which is proportional to a time average of the input voltage. This is made possible by connecting condenser 39 in parallel with resistor 31. The effect of the presence of condenser 39 is to provide through it a very high negative feedback immediately following a sudden change in input voltage. The output voltage changes exponentially from a value corresponding to the old to one corresponding to the new voltage, the rate of change being determined by the time constant R31—C39, the product of the feedback resistance by the feedback capacity. The output voltage finally obtained is again proportional to $$\frac{R31}{R32}$$

It can be shown that if the time constant R31—C39 is large compared to the time of persistence of the momentary fluctuations in the input voltage, the output voltage approximates to the average value thereof. As condenser 39 charges or discharges in response to a change in input voltage, the rate of change of the output voltage is determined by the time constant R31—C39 and the greater this time constant the greater weight is assigned to earlier values of input voltage. Such a circuit as that of Fig. 6E is referred to as an "averaging amplifier." A simple modification of this circuit is used in Fig. 14 in the derivation of the averaged wind components.

Referring now to Fig. 7, the output current of summing amplifier 40 traverses the winding of polar relay 41 of known type and having an armature 42 which is normally in a central position. From this position the armature is operated in a direction dependent on that of current flow in the winding of relay 41. The direction of current flow is determined by the algebraic sum of the input voltages to amplifier 40.

Servo-motor 43 is of the usual form and is provided with a rotor winding and two stator windings. One of the stator windings is supplied through 90 degrees phase shifting network 44 and transformer 45 from a source 46 of alternating voltage. The other stator winding is supplied from source 46 through center tap 47 on the secondary winding of transformer 48 only when armature 42 is operated to make contact with one or the other of terminals 49, 50, which are the secondary terminals of transformer 48. When either of such contacts is made the rotor of motor 43 is driven in the corresponding sense and turns shaft 51 as long as output current from amplifier 40 flows in the winding of relay 41. Shaft 51 controls the position of brush 52 on circular potentiometer 53.

The card of potentiometer 53 may be wound in a variety of ways to enable brush 52 to derive from source 54 of voltage V, across which potentiometer 53 is connected, a voltage $V_1$ proportional to any desired function of the angular position of shaft 51. For example, the winding of potentiometer 53 may conform to a sine function, as shown in Fig. 7. In this case $V_1$ is proportional to the sine of the angle E through which brush 52 has been turned from contact with the grounded end of potentiometer 53, or $V_1=V \sin E$. For the sake of illustration, amplifier 40 is shown with two input voltages of opposite polarity, one $V_1$ derived by brush 52, the other $V_2$, that of battery 55. These voltages are supplied to amplifier 40 as shown in Fig. 6B and, unless equal, cause a flow of output current which by suitable connection of the terminals of the secondary winding of transformer 48 drives shaft 51 in the proper direction and amount to make $V_1=V_2$. If now $V_2$ represents to a convenient scale the altitude H of the airplane above the earth's surface, and V to the same scale represents the slant range $R_s$ from the airplane to a surface target, shaft 51 comes to rest when the angle E equals the angle of depression of the target below a horizontal line drawn from the airplane, since $R_s \sin E=H$ and $V_1=KR_s \sin E$, $V_2=KH$, K being the scale factor.

In Fig. 7 the dotted rectangle 2 encloses relay 41, motor 43, phase shift network 44 and the motor power supply above described. In what follows it will be convenient to refer to the apparatus components enclosed by rectangle 2 as a "servo-motor," or "servo," representing their aggregate by a rectangle designated by a suitable numeral. It will be understood that voltage sources 54 and 55 are only illustratively shown as batteries.

Fig. 8 schematically shows a radar system installed in the attacking plane and used for finding the aim point and tracking the target. Antenna 60 at the focus of reflector 61 is highly directive and emits recurrent pulses of radio frequency energy which are returned as echoes from the aim point and appear as spots 62, 62' on the screen of plan position indicator 63 and of class B oscilloscope 64. The radar pulses to be emitted arrive at antenna 60 from duplexing unit 65 over wave guide 66, which includes a rotary joint 67 permitting rotation in the horizontal plane of antenna 60. Such rotation is effected through gears 68, 69, mounted respectively on the part of guide 66 above joint 67 and on shaft 70 driven by motor 71. Echoes returned from the target are focussed by reflector 61 on antenna 60, whence they pass through duplexing unit 65 to radio receiver 72. Therein they are suitably transformed to enter the video amplifiers designated by numerals 73, 74, respectively, from which they emerge as brightening voltage pulses on intensity control grids 75 and 76, respectively, of oscilloscopes 63 and 64.

Trigger pulse generator 77 produces recurrent sharp voltage pulses which, supplied to radio transmitter 78, give rise therein to the radio frequency pulses fed to antenna 60. At the same time the voltage pulses from generator 77 are supplied to control range sweep generator 79; this in turn produces a sweep voltage which through radial deflection circuit 80 provides a radial sweep for the cathode-ray beam of oscilloscope 63 and through vertical deflection circuit 81 provides a vertical sweep for the beam of oscilloscope 64. In the absence of a radially deflecting voltage, the cathode spot is arranged to be at the center of the screen of the plan position indicator; in the absence of a vertical deflecting voltage, the cathode beam of oscilloscope 64 is biased by known means (not shown in Fig. 8) to cause the spot deflection to start from the bottom of the screen. As is usual in such applications, each of the video amplifiers is designed to blank the corresponding screen trace throughout the return of the spot to its starting point and also during the outward or upward movement, except when the video amplifier receives a radar echo or generates a brightening impulse to produce a range mark such as the circle 83 on the screen of plan position indicator 63 or the horizontal line H on that of B oscilloscope 64, or receives a pulse producing an azimuth index such as radial line 94 or vertical line V.

The radial deflecting voltage from circuit 80 is applied through contacts 84 across deflecting coils 85. These coils are rotated about the axis of oscilloscope 63 by gear 86 through gear 87 on shaft 88 of servo-motor 89, and the radius along which is deflected the cathode beam of oscilloscope 63 is defined by the angular position of coils 85 and so of shaft 88. The deflecting voltage from circuit 81 applied to vertical plates 90 and 91 of oscilloscope 64 drives the cathode beam recurrently upward on the screen along chords that succeed each other from left to right or reversely as prescribed by the deflecting voltage applied to horizontal plates 92, 93.

In the simplest case, it is required that radial line 94 be directed toward the top of the screen of the plan position indicator when the radiation axis of reflector 61 is directed forward of the airplane. The servo-motor 89 which determines the corresponding position of coils 85 is itself controlled by amplifier 95. Amplifier 95 is of the general design shown in Fig. 6A. It sums the voltages applied to its input circuit over conductors 96, 97, 98 and 99. The positive voltage applied by conductor 96 is that of brush 100, insulated from shaft 88 but turning therewith to derive from potentiometer 101 a fraction of the voltage of battery 102 proportional to the angular position of coils 85. Conductor 99 in the same manner brings a negative voltage representative of the antenna facing, from brush 103 turning with shaft 70 but insulated therefrom and traversing potentiometer 104 across which is connected battery 105. Potentiometers 101 and 104 are fixed in the structures supporting shafts 88 and 70, respectively, and are respectively concentric with those shafts. The voltage sources supplying conductors 97 and 98 will be discussed in connection with Fig. 10. These serve to define the vertical radius on the screen of oscilloscope 63 with reference to some other direction than that of the momentary airplane heading. It is plain that, with no interference from conductors 97 and 98, brushes

100 and 103 may be in preliminary adjustment so positioned that +100 volts appear at brush 100 when coils 85 are positioned to deflect the electron beam along a vertical radius 94', −100 volts at brush 103 when the axis of reflector 61 points forward of the airplane. The net input voltage to amplifier 95 is then zero and motor 89 with shaft 88 is at rest. As the antenna turns, its position will be followed by the rotation of coils 85, but the vertical radius on the screen of the plan position indicator will correspond continually to the airplane heading. In the diagram of Fig. 8, with no voltage inputs to amplifier 95 via conductors 97 and 98, the echo of an object dead ahead will appear on dashed radial line 94'.

Fixed on but insulated from an extension of shaft 70 is also brush 106 traversing potentiometer 104' to derive from battery 105' a negative voltage identically like that on brush 103. The voltage from brush 106 forms one input to antenna azimuth amplifier 107 via conductor 108. Two other inputs via conductors 109, 110, respectively, are shown. That via conductor 109 is the voltage at brush 111, turning with shaft 112 of azimuth servo-motor 113 and traversing potentiometer 114. As will presently appear, motor 113 turns shaft 112 proportionately to the bearing of the actual target from the attacking airplane and this bearing differs from that of the aim point by the angle $$\frac{L}{R+L}(C+D)=B$$

approximately, writing B for tan B, $(C+D)$ for sin $(C+D)$ and cos $(C+D)=1$, which is approximately correct for the prescribed approach course. A voltage representing angle B is provided via conductor 110 as described in connection with Fig. 9. Three output voltages corresponding to the varying sum of the voltages on conductors 108, 109 and 110, are obtained via conductors 115, 116, and 117 from amplifier 107. That on conductor 115 controls polarized relay 118 which in turn controls sector scanning circuit 119 to drive motor 71 and shaft 70. The voltage on conductor 116 controls azimuth index generator 120 to provide, when this voltage is zero, impulses to video amplifiers 73 and 74 resulting in a trace brightening voltage on each of grids 75 and 76, producing a bright line on the corresponding screen, namely lines 94 and V. Potentiometers 101, 104 and 104' are linear.

Sector scan circuit 119 contains a pair of reversing relays controlled by armature 122 of relay 118 to cause the rotation of shaft 70 to reverse whenever armature 122 is deflected and this occurs when the sum of voltage inputs to amplifier 107 (and so the output voltage on conductor 115) differs in either direction from zero by a previously prescribed amount. Antenna 60 thus scans a forward sector 60 degrees wide centered about the position corresponding to zero voltage input to amplifier 107. Likewise the voltages on conductors 116 and 117 vary through zero to prescribed limits on either side. The voltage on conductor 117 controls the horizontal position of the cathode-ray trace on the screen of the B oscilloscope (invisible until brightened by a pulse from video amplifier 74) between prescribed limits, conveniently ±20 degrees, either side of central line V which as previously described is brightened by an azimuth index pulse when the voltage input to amplifier 107 is zero. An azimuth index pulse also appears on the screen of the plan position indicator 63 producing a bright line 94 in a radial position relative to the top of the screen as determined by the sum of voltage inputs to amplifier 95.

Range sweep generator 79 is stimulated by the recurrent pulses from generator 77 to produce a rising sweep voltage starting with each trigger pulse and lasting for a convenient fraction of the recurrence interval, which may be some 700 microseconds when a target is being tracked. This sweep voltage equals, once in each recurrence, a slowly varying voltage representing the slant range from airplane to aim point which is introduced via conductor 123 from the slant range circuit later to be described. At this moment of equality a pulse is passed over conductor 124 to video amplifiers 73 and 74 which thereupon furnish trace brightening pulses to oscilloscope grids 75 and 76. At an instant in each sweep adjustably earlier than that of equality of slant range and sweep voltages, the rising sweep voltage is allowed to deflect the cathode beams of oscilloscopes 63 and 64, over deflecting circuits 80 and 81, respectively. The interval between these two instants is adjusted to be that required by the cathode-ray beams to travel half way out from their respective starting points, namely, the center of the screen of the plan position indicator and the bottom of the B oscilloscope.

Thus, at the successive instants of equality of slant range and sweep voltages, bright spots appear on the screen of oscilloscopes 63 and 64, on successive sweeps always at a definite distance from the sweep starting point regardless of the actual value of the voltage on conductor 123. These bright spots fuse visually to form circle 83 on oscilloscope 63 and horizontal line H on oscilloscope 64. The sector scanned by the antenna corresponds to a 60-degree sector on the plan position indicator, so that of circle 83 only this arc is visible, while the corresponding voltage from azimuth sweep generator 121 is adjusted to cover horizontally the entire width of the screen of oscilloscope 64. The scale of vertical deflection on this screen is independent of the scale of radial deflection on the screen of the plan position indicator, so the B oscilloscope shows a magnified picture of the area about the aim point. The means of producing these oscilloscope presentations are disclosed and claimed in United States Patent 2,422,697, "Viewing System," granted June 24, 1947, to L. A. Meacham.

It is to be understood that antenna 60 and shaft 70 with the associated potentiometers and driving motor should be supported on a stabilized platform. Further, that means may be provided for tilting the antenna structure about a horizontal axis; such means are not shown, being not a part of or needed to describe the present invention.

Since the aim point is being observed, the tracking process must provide a voltage on conductor 109 from brush 111 continuously representing the bearing of the actual target, a voltage cooperating with those received via conductors 108 and 110 to insure the coincidence of aimpoint echo spots 62, 62' with azimuth indices 94 and V, respectively. There must be provided also a voltage via conductor 123 continuously representing the slant range to the aim point, to insure the coincidence of spots 62, 62' with range indices 83 and H, respectively.

The voltage on conductor 110, Fig. 8, is derived by means of the circuit shown in Fig. 9 where cooperating elements of Fig. 8 are diagrammatically repeated. To anticipate in part the latter description, the computing system includes means for fixing a direction in space, that of the airplane heading at the beginning of the bombing run, and these means provide among other quantities a voltage representing the angle D, Figs. 3 and 4, between the gyro axis and the line from airplane to actual target, an angle represented by the angular position of shaft 235 which controls brush 131 traversing potentiometer 132, the center of which corresponds to $D=0$. Also provided in the computer are shafts 134, 167 and 136. Shaft 134 is set by hand to place brush 137 at such a point on circular resistor 138 that the resistance included between brush 137 and the lower end of resistor 138 is proportional to the offset distance L between target and aim point. Shaft 167 is continuously driven, turning brush 139 on circular resistor 140 to include a resistance proportional to the target horizontal range between brush 139 and the lower end of resistor 140. Shaft 136 is set by hand so to position simultaneously brushes 141 and 142 on circular resistors 143 and 144, respectively, that between the mid-points of these resistors and the respective brushes are included resistances proportional to the offset angle C of which positive values are set to the right of the mid-points.

The lower end of resistor 138 is joined to brush 139 by conductor 150, and brush 137 is connected to +100-volt battery 151. The lower end of resistor 140 is connected by conductor 152 to brush 131, which traverses potentiometer 132 connected across brushes 141 and 142. An inspection of the diagram of Fig. 9 will show that when brushes 141 and 142 are displaced by the angle C from the mid-points of resistors 143, 144, and the lower end of resistor 143 is connected to +200 volts from battery 153, resistor 144 being grounded at one end as shown, there will appear on conductor 152 the voltage $$V'=+100-(C+D)$$

The voltage divider between conductor 152 and ground, which comprises portions of resistors 140 and 138, provides on conductor 110 the voltage $$V_2=+100-\frac{L}{R+L}(C+D)$$

This voltage is supplied to amplifier 107 and with the voltages on conductors 108 and 109 enables that amplifier to control the sector scanning of antenna 60 and the sweep of the cathode ray beam of the "B" oscilloscope together with the actuation of azimuth index generator 120, Fig. 8. The net voltage input to amplifier 107 is then proportional to $$A-A_a-\frac{L}{R+L}(C+D)$$

where A is the bearing of the actual target, $A_a$ that of the aimpoint, and $$\frac{L}{R+L}(C+D)$$

is the angle between these directions. $A_a$ is directly observed, L and C are known, while A, R and D are computed as the operator controls the system of the invention to keep the echo spots bisected by their respective range and azimuth indices.

Referring now to Fig. 10, where certain elements of Fig. 8 are diagrammatically repeated, amplifier 95 receives voltage inputs over conductors 96 and 99 from potentiometers 101 and 104, respectively, which by themselves would cause motor 89 to turn the deflecting coils of the plan position indicator so that the radius 94' of the screen of oscilloscope 63 should continuously represent the changing heading of the airplane. It is desired to make the radius 94' represent instead the constant direction from target to aim point, in which case the angle between this radius and radius 94 will be $C+Da$ (Fig. 4), which as previously explained must not exceed a value related to the distance L between target and aim point. The required lag between the radii 94 and 94' is produced by the voltages added via conductors 97 and 98.

Inspection of Fig. 4 shows that $C+Da=A_a-G+C$, where $A_a$ and C have already been defined and angle G is continuously read by the computer as that between the gyro axis and the momentary heading of the airplane. Angle G is measured by the angular position of shaft 155 of the computing system, traversing brush 156 over potentiometer 157 to derive a voltage proportional to G which is supplied to amplifier 95 via conductor 97. A negative voltage varying proportionally to C is obtained by brush 158 from potentiometer 159, brush 158 being rotated by shaft 136 also shown in Fig. 9. This last voltage is supplied to amplifier 95 via conductor 98. The net voltage input to amplifier 95 so controls the position of deflecting coils 85 (not shown in Fig. 10) that the radial sweep on the plan position indicator screen lags or leads the direction of the beam from antenna 60 by the angle $G-C$, where C is fixed and G varies between positive and negative values as the airplane maneuvers. All the potentiometers shown in Figs. 9 and 10 are linear.

One function of the plan position indicator during the bombing run is to warn the operator when the permissible limits of maneuver (Fig. 5) are being approached. Tracking the target is controlled with reference to the rectangular presentation on the screen of the B oscilloscope, and to this the following description will be confined.

To solve the release Equation 1 and the steering Equation 2, above, it is necessary to provide continuous measurement of target horizontal range and azimuth angle relative to the attacking airplane, together with the sine and the cosine of the azimuth angle and the time rates of change of range and of azimuth, the latter being treated as the sum of the angle between an arbitrary horizontal direction and that of the target and the angle between the airplane heading and the arbitrary direction, $A=D+G$, Fig. 4, where G is constant during the bombing run so that the time rates of change $d$A and $d$D are equal. Actually observation is made of the aim point azimuth, $Aa=Da+G$, where $Da=D-B$, Fig. 4. Inspection of Fig. 3 shows that $$A=G+D_0+\frac{T}{T+R}\sin A$$

where $D_0$ is the angle (nearly constant during the attack) between the arbitrary direction (identified as the gyro axis) and the correct bombing course, $$\frac{T}{T+R}\sin A$$

(Fig. 1) is the approximate expression for the angle at any moment between the correct course and the direction of the target, and G is the angle between the airplane heading and the arbitrary direction, all positive when clockwise from the airplane. In the description of Figs. 9 and 10 there were assumed determined the angles A, D and G, as well as the horizontal range R, there being known beforehand the offset angle C and distance L.

Fig. 11 shows the arrangement for providing the angle G. Vertical shaft 155, Fig. 10, is adapted to be clutched by a magnetically operated clutch 171 to vertical shaft 155' of the directional gyroscope 170 with which the airplane is understood to be equipped. Linear quadrantal potentiometer 157 of Fig. 10 is fixed to the structure of the airplane concentrically with shaft 155 and is traversed by brush 156 fixed to that shaft as the airplane turns. The mid-point of potentiometer 157 is on a radius thereof parallel to the fore and aft axis of the airplane, so that the movement of the airplane as it turns relatively to the gyro axis varies the voltage derived by brush 156 proportionately to the change in heading. This voltage is then a constant plus a term proportional to the angle G, which may be positive or negative, and is supplied over conductor 97 to amplifier 95, Fig. 8.

In addition to brush 156, shaft 155 carries brushes 158 and 159 permanently set at right angles to each other and traversing semicircular sine potentiometer 160, which like potentiometer 157 is fixed relatively to the airplane. As the airplane changes heading from that at the moment of clutching shaft 155 to shaft 155', the positions of brushes 156, 158 and 159 remain fixed in space under the control of directional gyroscope 170, while potentiometers 157 and 160 move under their respective brushes through the angle G. The zero of G is the mid-radius of potentiometer 157 and the radii of potentiometer 160 45 degrees each side of the mid-radius thereof. Means, not shown, may be provided whereby when clutch 171 is released, shaft 155 is returned to place brushes 156, 158 and 159 on the respective radii representing $G=0$. Such return would be needed only if the attack is interrupted and a new initial heading must be established from which to measure G; it will be assumed that no such interruption occurs, clutch 171 having been operated at the beginning of the bombing run.

Across potentiometer 160 is connected a negative voltage representing the corrected air speed of the plane, symbolized by the voltage of brush 161 on potentiometer 162 shunting battery 163. Air speed S may be derived, with correction for temperature and pressure, as disclosed and claimed in my United States Patent 2,457,287, granted December 28, 1948, "Airspeed Indicating System." For the present purpose the corrected air speed is assumed known and brush 161 set accordingly. Brushes 158 and 159 then derive respectively voltages representing $-S\sin(45°-G)$ and $-S\cos(45°-G)$. These are the Y and X components, respectively $Sy$ and $Sx$, shown in Fig. 2, involved in the determination of the wind velocity. Three other potentiometers, two sine and one linear, shown in later figures, are associated with brushes controlled by shaft 155.

The target horizontal range R is represented by voltages proportional to the angular position of range shaft 167, shown in Fig. 12, as driven at a controllable speed by motor 168, through differential gear 169. The speed control of motor 168 is symbolized by a variable voltage from potentiometer 172 connected across battery 173, the position of brush 174 on that potentiometer being adjusted by turning knob 175. Independently of this speed control, knob 176 may be manipulated to advance or retard through differential gear 169, the angular position of range shaft 167.

Concentric with shaft 167 are linear potentiometers 177 and 178, grounded as shown in Fig. 12 and traversed respectively by brushes 179, 180 which turn with shaft 167. A voltage negative to ground, as from battery 181, is shunted by potentiometer 177 from which brush 179 derives a voltage to ground proportional to the target horizontal range. How shaft 167 is properly positioned and driven at the proper speed will presently appear.

Brush 179 is connected to the ungrounded end of potentiometer 178 from which brush 180 therefore obtains a voltage representing $-R^2$. This voltage is one of the inputs to summing amplifier 182.

It will be recalled that the limits prescribed for the attack are such that the line $P_0OQ$, Fig. 4, may be considered approximately straight, so that the aim point horizontal range may be written with negligible error as $R+L$. The altitude H of the attack being known, the aim point slant range $R_s$ is given by $R_s^2=H^2+(R+L)^2$, approximately.

Knob 183 controlled by hand, sets shaft 184 in accordance with the known altitude H so to place brushes 185 and 186, respectively on potentiometers 187 and 188, concentric with shaft 184, as to provide at brush 186 a voltage proportional to $-H^2$. This will appear from inspection of Fig. 12. Negative battery 190 shunts to ground potentiometer 187, brush 185 is connected to the end of potentiometer 188 aligned with the corresponding end of potentiometer 187, its remote end being grounded. This voltage, $-H^2$, forms also an input to amplifier 182. A dial 191 is provided on which is read the altitude setting of shaft 184.

The known offset distance L is set by hand through knob 192 controlling shaft 193 and is read on dial 194. Concentric with shaft 193 are potentiometers 195, 196 of which the former is wound on a triangular card and the latter is linear. Setting knob 192 to read offset distance L on dial 194 places brush 197 on potentiometer 195 to derive from negative battery 198 a voltage proportional to $-L^2$. Brush 179 is connected as shown to potentiometer 196 of which a portion proportional to L is included between ground and brush 199, which accordingly provides a voltage to ground representing $-RL$. This last voltage, fed to summing amplifier 182 through an input resistor, proportioned as earlier described to those concerned with the inputs $-H^2$, $-R^2$ and $-L^2$, contributes effectively a voltage corresponding to $-2RL$ to the input of amplifier 182. The output of this amplifier controls servo-motor 200 to drive shaft 201. Concentric with shaft 201 are linear potentiometers 202, 203, traversed by brushes 204 and 205, respectively, the connection of which is like that of brushes 185, 186, above described and serves to derive from positive battery 206 a voltage proportional to $R_s^2$. This voltage, from brush 205, is also supplied to the input circuit of amplifier 182 and motor 200 comes to rest when $R_s^2-H^2-R^2-L^2-2RL=0$ and the angular position of shaft 201 represents the slant range from airplane to aim point. It will be noted that altitude and offset distance are set by hand on shafts 184 and 193, while the position of shaft 167 (the horizontal target range) is determined by the process of tracking the aim point. Conductor 123 furnishes from brush 204 on potentiometer 202, a voltage proportional to $R_s$ which is supplied to range sweep generator 79, Fig. 8, to produce the horizontal range line H on the screen of oscilloscope 64. Dials, not shown, may be provided to read horizontal target range (on shaft 167) and aim point slant range (on shaft 201).

Fig. 13 shows schematically the means for providing shaft motions representing angles A and D. Horizontal range shaft 167 carries, in addition to brushes 179 and 180 of Fig. 12, other brushes transversing linear resistors and potentiometers concentric with shaft 167, among them brush 209 on resistor 210, Fig. 13. Between the upper end of resistor 210 and brush 209 is included a resistance proportional to R, and brush 209 is connected to the upper end of circular resistor 211, on which grounded brush 212 on shaft 322 is set by hand (knob 308) to insert between ground and brush 209 a resistance proportional to the trail T. Negative battery 213 shunts circular potentiometer 214 on which brush 215 is set by hand (knob 208) to a radius making an angle $D_0$ (selected as later explained) with the mid radius of potentiometer 214. Conductor 216 accordingly provides a voltage to ground of $-50$ v. $-D_0$ as one input to summing amplifier 217. Another input to amplifier 217 is via conductor 218 from brush 219 controlled by the relative motion of shaft 155, Fig. 11, to define the angle G from the mid-point of potentiometer 220 and to derive the voltage $+50$ v. $-G$ from battery 221. The output of amplifier 217 via conductor 222 controls azimuth servo-motor 113 driving target azimuth shaft 112. Among various potentiometers associated with shaft 112 are potentiometers 225 and 226, linear and sinusoidal, respectively, supplied from batteries as shown in Fig. 13. The voltage at the mid-point of each of these is zero, and as brushes 227, 228 turn through the angle A from the respective mid-points, the former derives a voltage representing A while the voltage of the latter represents $-\sin A$. Voltage A via conductor 229 is fed back directly to the input of amplifier 217. Conductor 230 joins brush 228 to the upper end of resistor 210 and the junction of brush 209 and resistor 211 furnishes, via conductor 231, the voltage $$-\frac{T}{T+R}\sin A$$

to the input of amplifier 217. Servo-motor 113 then moves to keep the voltage via conductor 229 equal to the sum of the voltages 50 v. $-G$, $-50$ v. $-D_0$ and $$-\frac{T}{T+R}\sin A$$

The voltage from brush 227 then continuously represents the azimuth of the target since $$A=G+D_0+\frac{T}{T+R}\sin A$$

Conductors 218 and 229 also provide voltage inputs to summing amplifier 232, the output of which via conductor 233 controls servo-motor 234, driving shaft 235 proportionally to the angle D. Shaft 235 carries brush 236 traversing circular linear potentiometer 237 to derive from negative battery 238 a voltage fed by conductor 239 to the input of amplifier 232, continuously balancing the input voltages of A and $+50$ v. $-G$. The voltage on conductor 239 is therefore $-50$ v. $-D$ and the angular displacement of brush 236 from the mid-point of potentiometer 237 varies proportionally to the angle D.

The target horizontal range R, target azimuth A and auxiliary angles G and D are therefore represented by the angular positions of their respective shafts as follows:

R, shaft 167 (Fig. 12); A, shaft 112 (Fig. 13);

G, shaft 155 (Fig. 11); and D, shaft 235, (Fig. 13). These shaft motions are then available to control the derivation by suitable potentiometric means of the other quantities involved in the release and steering equations.

To derive the components $W_x$ and $W_y$ of the wind speed, Fig. 2, the differential components along axes X and Y of the horizontal target range R are combined with the corresponding components of corrected air speed S. If $dR_x$ and $dR_y$ are respectively the time rates of change of the X and Y components of R, and $S_x$ and $S_y$ are similar components of the air speed S, then $$W_x=dR_x-S_x,\quad W_y=dR_y-S_y$$

Fig. 14 shows the circuit arrangement by means of which $W_x$ and $W_y$ are obtained and averaged. The corrected air speed is assumed to be known and set on potentiometer 162, Fig. 11, wherefrom are derived $-S_x=-S\cos(45°-G)$ and $-S_y=-S\sin(45°-G)$. For convenience, these are repeated in Fig. 14 which exhibits the cooperation of shaft 167 whose angular position represents the horizontal target range R, of shaft 235 for the angle D as in Fig. 13, and of shaft 155 for the angle G, Fig. 11. Circuits for the averaging of wind speed components are disclosed and claimed in application, Serial No. 590,604, Averaging Device, filed April 27, 1945, by S. Darlington, C. H. Townes and D. E. Wooldridge and assigned to the same assignee as the present invention.

Referring to Fig. 14, range shaft 167 carries also brush 240 transversing potentiometer 241 to derive from battery 242 a voltage $-R$. This is impressed across sine potentiometer 243 of which the mid-point is grounded, and brushes 244 and 245 turning with shaft 235, repeated from Fig. 13, derive voltages representing $-R_x=-R\cos(45°+D)$, and $-R_y=-R\sin(45°+D)$, these derived voltages being differentiated by capacitors 246 and 247, respectively. Since R is decreasing as the target is approached, there appear positive differential voltages $dR_x$ and $dR_y$ as inputs to amplifiers 248 and 249, respectively. Here they are individually summed with the corresponding voltages $-S_x$ and $-S_y$ to appear as output voltages $-W_x$ and $-W_y$ of amplifiers 248 and 249. These amplifiers are averaging amplifiers, such as are shown in Fig. 6E, being provided with feedback paths including the time constant circuits comprising resistors R1 and R2 and condensers C1 and C2, respectively. There results from each of amplifiers 248 and 249 an averaged value of the corresponding component of the wind velocity. Resistors R1 and R2, shown in Fig. 14 as variable, may be varied during the bombing run to increase progressively the time constants in order to give greater weighting to the later observations. On inspection of Fig. 14, it is seen that the weighted values of $W_x$ and $W_y$ so obtained may be combined with fractions of the constant value of S to provide the required speeds in the direction of the target $d$R and at right angles thereto R$d$D:

$$RdD=S\sin A+W_x\sin(45^\circ+D)-W_y\cos(45^\circ+D) \quad (3)$$

$$dR=S\cos A+W_x\cos(45^\circ+D)+W_y\sin(45^\circ+D) \quad (4)$$

Before the description of the circuit elements providing the summations just stated, the operator's procedure is briefly explained as follows.

At the moment of starting the bombing run, clutch 171, Fig. 11, is energized to establish the arbitrary direction with reference to which are measured the other angles needed in the computation. Horizontal range motor 168 is started, say at about 50,000 feet from the target, and simultaneous manipulation of range rate and position knobs 175 and 176, respectively (Fig. 12), and of knob 208 (Fig. 13) controlling the voltage $D_0$ from potentiometer 214 enables the operator to keep the aim point echo bisected by the horizontal and vertical central lines on the screen of oscilloscope 64. The operator's manipulation thus solves the equations involved in the circuits of Figs. 8, 12 and 13. Bisecting the aim point echo horizontally solves for R in the equation $R_s^2=H^2+(R+L)^2$, where $R_s$ is observed and H and L are known. Bisecting the echo vertically, with this value for R, solves for A in the equation involved in the circuit of Fig. 9, namely, $$A=A_a+\frac{L}{R+L}(C+D)$$

where $A_a$ is observed, L and C are known, and $D=A-G$, G being found as shown in Fig. 11. The speed control of motor 168 causes the position of shaft 167 to vary, approximately uniformly with time, as the target is approached and so tracks continuously the target horizontal range. R being thus determined, G being continuously observed, and T being known, $D_0$ is adjusted by hand in the circuit of Fig. 13 to satisfy, by vertically bisecting the echo spot, the equation $$A=D_0+G+\frac{T}{R+T}\sin A$$

In this equation the target bearing and that of the gyro axis relative to the airplane heading are A and G, respectively, while $D_0$ is the nearly constant angle between gyro axis and correct bombing course and $$\frac{T}{R+T}\sin A$$

is the angle between the correct course and the target direction, Fig. 3. The actual ground course of the airplane PP″, differs from the correct course by the angle J, Fig. 3. J is to be displayed on a steering meter and must be reduced to zero by the pilot of the airplane before reaching the release point given by Equation 1 above.

From the values R and D so computed, their time derivatives may be at once obtained and substituted in Equations 1 and 2. For greater accuracy, the speeds $d$R, in line with the target, and R$d$D at right angles thereto, are obtained from Equations 3 and 4 in which tracking errors least affect the result, S being determined independently of the tracking procedure and W being a value averaged over the entire bombing run.

Referring now to Fig. 15, shafts 112 and 235, repeated from Fig. 13 and defining respectively angles A and D, are used in the computation of the speeds R$d$D and $d$R. Shaft 112 carries in addition to potentiometer brushes already described, brushes 260 and 261 sweeping over sine potentiometer 262, across a portion of which is impressed the voltage —S from the circuit of Fig. 11. Potentiometer 262, in an actual embodiment of the system of the present invention, has the unconventional form shown in Fig. 15, where a semicircle is divided into two parts, one of 135 degrees and of the usual sine form, the other of 45 degrees and repeating a portion of the first part, the 45 degrees portion being designated as 262A and connected to ground through resistors 263 and 264 in series. Portion 262 is grounded at the end remote from portion 262A, and the resistances 263, 264, 262A and 262 are so chosen that between conductor —S and ground there are two parallel paths of equal total resistance. Resistances 263 and 264 are so chosen in relation to that of portion 262A that from junction 265 a voltage $$-\frac{S}{\sqrt{2}}$$

may be taken via conductor 266 to input $a$ of amplifier 267 and to input $b$ of amplifier 268. Brushes 260 and 261 then derive from potentiometers 262—262A voltages proportional respectively to $$-S\left(\cos A+\frac{1}{\sqrt{2}}\right)$$

and to $$-S\left(\sin A+\frac{1}{\sqrt{2}}\right)$$

These voltages are fed by conductors 269 and 270, respectively to the inputs "$a$" of amplifier 268, and "$b$" of amplifier 267.

At the same time the negative voltage representing $-W_x$, the averaged X component of the wind velocity, is connected across sine potentiometer 271 while the voltage $-W_y$ represents the averaged Y component of the wind and is connected across sine potentiometer 272, the midpoints of these potentiometers being grounded. Shaft 235, of which the angular position represents the angle D, Fig. 13, carries brushes 273 and 274 on radii at right angles to each other and sweeping over potentiometer 271. Accordingly, there are available fractional voltages, $-W_x\sin(45^\circ+D)$ from brush 273, $-W_x\cos(45^\circ+D)$ from brush 274. Similarly, from potentiometer 272, brushes 275, 276 driven by shaft 235 derive $$-W_y\sin(45^\circ+D)$$

and $-W_y\cos(45^\circ+D)$.

Amplifiers 267 and 268 are differencing amplifiers, such as are shown in Fig. 6B. The net input of amplifier 267 appears with reversed phase on conductor 280 as $$-RdD=-S\sin A-W_x\sin(45^\circ+D)+W_y\cos(45^\circ+D)$$

which is the negative of the speed of the airplane at right angles to the target direction, this speed being counted positive when directed as shown in Fig. 1 ($a$P″). At the same time on conductor 290 there appears, with reversed phase on the input to amplifier 268

$$dR=S\cos A+W_x\cos(45^\circ+D)+W_y\sin(45^\circ+D)$$

or the speed in the direction of the target, P$a$ of Fig. 1. Circuits for deriving the horizontal speed components toward the target and at right angles to the target direction are disclosed and claimed in United States Patent 2,439,381, "Computing Bombsight," granted April 13, 1948, to S. Darlington, C. H. Townes and D. E. Wooldridge.

The voltages representing the speeds so determined are used in the circuit of Fig. 16 to determine the angle J between the airplane's actual course and the correct bombing course. The angle J so found is represented by the reading of meter 310 on which a negative reading corresponds to a correct course lying to the right of the actual course. To provide this indication, the voltage —R$d$D on conductor 280 is fed by conductor 281 directly to the "$a$" input of differencing amplifier 282 and by conductor 283 to the mid-point of cosine potentiometer 284 from which brush 285, driven by azimuth shaft 112 derives from battery 286 the fractional voltage $-RdD\cos A$, which is fed by conductor 291 to the input of amplifier 287. A second input voltage of amplifier 287 is $dR\sin A$ via conductor 292, obtained from battery 288 and sine potentiometer 289 by brush 293, the voltage $d$R on conductor 290 being connected to the end of potentiometer 289 remote from battery 288. Amplifier 287 is a dividing amplifier, such as is shown in Fig. 6C. Circular resistor 294 in series with battery 295 is connected across the output of amplifier 287 and a fraction of this resistance proportional to the target range is selected by brush 296 carried on range shaft 167 and fed back to the input of amplifier 287. There results an output voltage on conductor 297 representing the expression $$-\frac{1}{R}(RdD\cos A-dR\sin A)$$

This output voltage must be multiplied by T, proportional to the trail of the particular type of bomb to be dropped on the target.

Circular resistor 298 with battery 299 in series is connected across the output of amplifier 287 and fractionated proportionally to T by brush 300, handset by knob 308 which may be provided with a scale graduated to indicate the trail T. From brush 300, conductor 302 then supplies to the "*b*" input of amplifier 282 a voltage representing $$-\frac{T}{R}(RdD\cos A-dR\sin A)$$

which when $J=0$ and the actual ground course of the airplane is the correct bombing course, equals R*d*D. For any other ground course the voltage output of amplifier 282 will not be zero but will vary directly with angle J which may obviously be represented by the angular position of a shaft 303 driven by servo-motor 304 from amplifier 282, turning brush 305 to derive from potentiometer 306, shunted to ground by battery 307, a voltage fed to the input of amplifier 282 and equal when motor 304 comes to rest, to the net input via conductors 281 and 302. The angular position of shaft 303 then represents the angle J. By a duplicate of potentiometer 306 and associated parts the voltage representing J is made readable on meter 310 where a negative value, as shown, indicates that the bombing course calls for a deflection of the airplane's heading to the right, the situation shown in Fig. 3. It will be understood that meter 310 is adjusted to read zero when $J=0$ and half the voltage of battery 309 is supplied from brush 311 on potentiometer 312. It will be further understood that the voltages of batteries 288, 286, 295, 299 and 307 are suitably chosen so that their constant terms cancel in the input voltages to amplifier 282 as such terms do in the circuit of Fig. 9.

The steering angle J being thus displayed on meter 310, the pilot is required to swing to such a heading as will make $J=0$ while the airplane is still sufficiently remote from the release point to enable the distance to go to be properly computed for the correct bombing course. Suitable adjustments of the rate and range knobs 175 and 176, of Fig. 12, then assure the appropriate values of *d*R, R and A for the distance to go circuit of Fig. 17.

Referring now to Fig. 17, horizontal range shaft 167 and azimuth shaft 112 are seen to control each a brush on a potentiometer additional to those already described. Range shaft 167 drives brush 315 on potentiometer 316 to derive the voltage —R from battery 317, and this voltage is one of the simultaneous inputs to summing amplifiers 330 and 340. Another input voltage $-T\cos A$, is provided from brush 318, driven over cosine potentiometer 319 by azimuth shaft 112. Potentiometer 319 is grounded at each end and connected at its mid-point to brush 320 on potentiometer 321. Shaft 322, hand operated by knob 308, places brush 320 on potentiometer 321 to derive from battery 324 a voltage proportional to the trail T of the bomb. A third input voltage to amplifiers 330 and 340 is supplied by brush 325 on shaft 326 set by knob 327. Brush 325 is placed on potentiometer 328, supplied as indicated in Fig. 17 at its opposite ends from battery 329 and voltage *d*R, in an angular position corresponding to the known time of bomb fall F, and thus provides for amplifiers 330 and 340 an input voltage proportional to *d*R.F. Amplifiers 330 and 340, which are understood to be summing amplifiers providing an output voltage reversed in phase with respect to their input, then furnish via each of conductors 331 and 341 the voltage $R+T\cos A-dR.F.$, which becomes zero at the release point P, Fig. 1. To conductors 331 and 341 are connected respectively distance to go meter 332, on which is read the distance yet to fly before reaching the release point, and bomb release circuit 342, which may be of any suitable design operated to release the bomb when the input voltage via conductor 341 falls to zero. It is understood that batteries 317, 324 and 329 are suitably chosen so that their constant terms sum to zero on the inputs of amplifiers 330 and 340. Steering and distance-to-go meters are disclosed and claimed in United States Patent 2,438,112, "Bombsight Computer," granted March 23, 1948, to S. Darlington.

It will be understood that the gearing shown in the mechanism driving the antenna and the deflecting coils of the plan position indicator in Fig. 8 may be of any desired ratio as well as the one to one ratio illustrated and further that shafts shown in subsequent figures may be driven through suitable gearing from their controlling servo-motors for any desired purpose, as for example to increase the accuracy of potentiometer settings by making a quadrant of the potentiometer represent 45 degrees of the angle to be indicated. Moreover, it will be recognized that the radar observing system described in connection with Fig. 8 may be, by means readily available in the art, replaced by optical means. The various voltage sources symbolized by separate batteries are derived by suitable means from the airplane power supply.

The invention has been described with reference to its military purpose. It provides a computing system enabling an airplane flying at a known altitude and at a known speed to determine in what direction and at what point to release bombs upon a target, the target being itself unobservable while observation is continuously made of a point lying at a known distance and in a known direction from the target itself. It will be obvious that, by setting the time of fall and the trail both to zero, the system may be used to determine the correct course on which to fly to pass over an invisible destination and the moment at which the airplane is vertically thereabove.

What is claimed is:

1. In a computing circuit for an electrical tracking system, means for tracking in bearing and in horizontal range from an airplane flying at a known altitude a concealed objective lying at a known distance and in a known direction from an observed aimpoint, including means for continuously indicating the slant range of the aimpoint, means for establishing and indicating a first quantity of which the square is proportional to the sum of squares of the known altitude and of the known distance plus a first variable quantity, means for comparing the indications of the slant range and of the first quantity, means for continuously adjusting the first variable quantity to effect equality of the indicated quantities thereby making the first variable quantity continuously proportional to the horizontal range of the objective, means for continuously indicating the bearing of the aimpoint, means for establishing a second quantity representative of said bearing, means for establishing a third quantity representative of the quotient of the projection of the known distance at right angles to said bearing divided by the sum of the known distance and said horizontal range, means for establishing a second variable quantity, means for continuously adjusting the second variable quantity to equality with the algebraic sum of the representative quantities, thereby adjusting the second variable quantity to be continuously proportional to the bearing of the objective, and means for indicating each of the variable quantities.

2. Means for determining from a known altitude the horizontal range of a concealed target lying at a known distance from an aimpoint comprising means for observing the aimpoint, said observing means including a source of varying voltage and means for indicating the value thereof proportional to the slant range of the aimpoint, a first source of voltage, means for deriving from the first source a first voltage proportional to the square of the altitude, a second voltage proportional to the square of the known distance, a third voltage proportional to the square of a variable quantity and a fourth voltage proportional to twice the known distance multiplied by the quantity, means for summing the first, second, third and fourth voltages, a second source of voltage, means controlled by the summing means for deriving from the second source a fifth voltage proportional to said sum and a sixth voltage proportional to the square root of said sum, means for indicating the value of the sixth voltage and means for adjusting the variable quantity to equate the last and the first named indicated values, thereby making the variable quantity proportional to the target horizontal range.

3. Means for determining from a known altitude the horizontal range of a concealed target lying at a known distance from an aimpoint comprising means for observing the aimpoint and indicating the slant range thereof, a source of voltage, means for deriving from the source a voltage proportional to the hypotenuse of a right triangle of which one side is proportional to the known altitude and the other side is similarly proportional to the known distance plus a variable quantity, means for indicating the value of the derived voltage and means for adjusting the variable quantity to make the derived voltage proportional to the indicated slant range, thereby making the variable quantity proportional to the target horizontal range.

4. In tracking from an airplane flying at known altitude a concealed target lying at a known distance from an observed aimpoint, the method of finding the target horizontal range which comprises observing and indicating the aimpoint slant range, establishing and indicating a quantity of which the square is proportional to the sum of the squares of the altitude and of the distance plus a variable quantity, comparing the indicated slant range and the indicated quantity and continuously adjusting the variable quantity to make equal said indications, thereby making the variable quantity continuously proportional to the target horizontal range.

5. In tracking from an airplane flying at known altitude a concealed target lying at a known distance and in a known direction from an observed aimpoint, the method of finding the bearing of the target which comprises continuously observing and indicating the slant range and bearing of the aimpoint, establishing a first quantity continuously representative of the aimpoint bearing, establishing as in claim 4 a variable quantity proportional to the target horizontal range, establishing a second quantity representative of the angle subtended at a distance equal to the target horizontal range plus the known distance by the projection of the known distance at right angles to the aimpoint bearing, establishing a third quantity representative of a variable angle, comparing the third quantity with the algebraic sum of the first and second quantities and continuously adjusting the variable angle to make the third quantity equal to said sum, whereby the variable angle continuously equals the target bearing.

6. Means enabling an observer flying at a known altitude on known heading to determine the bearing of a concealed target lying at known compass angle and known distance from an observed aimpoint comprising means for observing and indicating the slant range and bearing of the aimpoint including a source of varying voltage and means for indicating the value thereof proportional to the slant range; a first source of voltage, means for deriving from the first source a first voltage proportional to the square of the altitude, a second voltage proportional to the square of the known distance, a third voltage proportional to the square of a variable quantity and a fourth voltage proportional to twice the known distance multiplied by the quantity, means for summing the first, second, third and fourth voltages, a second source of voltage, means controlled by the summing means for deriving from the second source a fifth voltage proportional to the sum of the summed voltages and a sixth voltage proportional to the square root of said sum, means for indicating the value of the sixth voltage and means for adjusting the variable quantity to equate the last and the first-named indicated values, thereby making the variable quantity proportional to the target horizontal range; a third, a fourth, a fifth and a sixth source of voltage, means controlled by the observing means for deriving from the third source a seventh voltage representative of the aimpoint bearing, means for establishing a reference horizontal direction and for defining the angle between said direction and the heading, means controlled by the defining means to derive from the fourth source an eighth voltage representative of the defined angle, a first and a second movable member, controllable means for establishing a motion of the first member representative of a variable angle and a motion of the second member representative of the algebraic difference between the variable and the defined angle, means controlled respectively by the first and by the second member to derive from the fifth source a ninth voltage representative of the variable angle and from the sixth source a tenth voltage representative of the sum of the compass angle and the algebraic difference multiplied by the known distance divided by the sum of that distance and the horizontal range, means for comparing the eighth voltage with the sum of the seventh and ninth voltages; and means for adjusting the controllable means to vary concomitantly the first and second motions to make the eighth voltage equal to the last-named sum thereby making the variable angle the target bearing relative to the heading and making the algebraic difference the target bearing relative to the reference direction.

7. For an observer flying at known altitude on known heading at known airspeed in a wind of unknown ground velocity and provided with means for determining the horizontal range of a target and the bearings thereof relative respectively to the heading and to a horizontal reference direction, means for providing voltages respectively proportional to rectangular horizontal components of the wind velocity comprising a source of voltage, means controlled by the determining means for deriving from the source a voltage proportional to the range, means for deriving from the range-proportional voltage a first and a second voltage proportional respectively to the components of the horizontal range in directions 45 degrees left and right of the reference direction, a second source of voltage, means for deriving from the second source a voltage proportional to the airspeed, means for deriving from the airspeed-proportional voltage a third and a fourth voltage respectively proportional to the components of the airspeed in directions 45 degrees left and right of the reference direction, means for differentiating with respect to time the first and second voltages to obtain a first and a second differential voltage and means for combining in opposition the first differential voltage with the third voltage and the second differential voltage with the fourth voltage to obtain fifth and sixth voltages respectively proportional to the algebraic differences between the combined voltages.

8. A system of apparatus enabling an observer to determine the components of his ground speed respectively in and transverse to the direction of a concealed target lying at a known distance and at known compass angle from an observed aimpoint, the observer moving at known altitude on know heading at known airspeed, comprising means for observing the slant range and bearing of the aimpoint including a source of varying voltage and means for indicating the value of said voltage proportional to the slant range of the aimpoint, a first and a second source of voltage, means for deriving from the first source a first, a second, a third and a fourth voltage proportional respectively to the square of the altitude, to the square of the known distance, to the square of a variable quantity and to twice the known distance multiplied by the quantity, means for summing the voltages derived from the first source, a second source of voltage, means for deriving from the second source a fifth and a sixth voltage proportional respectively to the sum of the voltages derived from the first source and to the square root of said sum, means for indicating the value of the sixth voltage, means for adjusting the variable quantity to equate the last and the first-named indicated values whereby the variable quantity is made proportional to the target horizontal range; a third source of voltage, means controlled by the observing means for deriving from the third source a seventh voltage representative of the aimpoint bearing, means for establishing a reference direction and defining the angle between said direction and the heading, a fourth source of voltage, means controlled by the defining means for deriving from the fourth source an eighth voltage, a first and a second movable member, controllable means for moving the first member representatively of a variable angle and the second member representatively of the algebraic difference between the variable and the defined angles, means controlled respectively by the first and by the second member to establish a ninth and a tenth voltage representative respectively of the variable angle and of the sum of the compass angle and the algebraic difference multiplied by the known distance divided by the sum of that distance and the horizontal range, means for comparing the ninth voltage with the sum of the seventh and tenth voltages, means for adjusting the controllable means to vary concomitantly the motions of the first and second members to make the ninth voltage equal to the sum of the seventh and tenth voltages whereby the variable angle is made equal to the target bearing relative to the heading and the algebraic difference is made equal to the target bearing relative to the reference direction; an additional source of voltage, means controlled by the target horizontal range and bearing determining means for deriving from the additional source a voltage proportional to the range, means for deriving from the range voltage an eleventh and a twelfth voltage proportional respectively to the components of the horizontal range in directions 45 degrees left and right of the reference direction, a second additional source of voltage, means for deriving from the second additional source a voltage proportional to the airspeed, means for deriving from the airspeed voltage a thirteenth and a fourteenth voltage respectively proportional to the like components of the airspeed, means for differentiating with respect to time the eleventh and twelfth voltages to provide respectively therefrom a first and a second differential voltage, means for deriving a fifteenth voltage proportional to the algebraic difference between the first differential voltage and the thirteenth voltage and a sixteenth voltage proportional to the like difference between the second differential voltage and the fourteenth voltage whereby the fifteenth and sixteenth voltages are proportional respectively to the windspeed components in directions 45 degrees left and right of the reference direction; means controlled by the controllable means for deriving from the airspeed voltage first and second fractional voltages proportional respectively to the components of the airspeed in and at right angles to the target bearing relative to the heading, means controlled by the controllable means for deriving from the first fractional voltage third and fourth fractional voltages proportional respectively to the components in and at right angles to said target bearing of the left-directed windspeed component and from the second fractional voltage fifth and sixth fractional voltages proportional respectively to the like components of the right-directed windspeed component, electrical means for summing the first, third and fifth fractional voltages to provide a first final voltage and electrical means for summing the second, fourth and sixth fractional voltages to provide a second final voltage, said final voltages representing the components of the observer's ground speed respectively in and at right angles to the target direction.

9. Means as in claim 8 for determining from a known altitude the horizontal range of a concealed target lying at a known distance from an aimpoint, including means for indicating the time rate of variation of the range.

References Cited in the file of this patent

FOREIGN PATENTS 164,765 Great Britain ------------------ 1921